United States Patent
Handshaw et al.

(10) Patent No.: US 10,063,753 B2
(45) Date of Patent: Aug. 28, 2018

(54) IMAGING MODULE FOR SUPPORTING PRINTED CIRCUIT BOARDS IN A PREDETERMINED ANGULAR RELATIONSHIP INSIDE AN IMAGING READER, AND METHOD OF ASSEMBLY

(71) Applicant: SYMBOL TECHNOLOGIES, LLC, Lincolnshire, IL (US)

(72) Inventors: Darran M. Handshaw, Sound Beach, NY (US); Joseph D. Giordano, Bayville, NY (US); Edward D. Barkan, Miller Place, NY (US); Mark E. Drzymala, Saint James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 218 days.

(21) Appl. No.: 15/135,787

(22) Filed: Apr. 22, 2016

(65) Prior Publication Data
US 2017/0310856 A1 Oct. 26, 2017

(51) Int. Cl.
*H04N 5/225* (2006.01)
*G03B 11/04* (2006.01)
*G03B 17/56* (2006.01)

(52) U.S. Cl.
CPC ......... *H04N 5/2252* (2013.01); *G03B 11/045* (2013.01); *G03B 17/563* (2013.01); *H04N 5/2253* (2013.01); *H04N 5/2256* (2013.01)

(58) Field of Classification Search
CPC .. H04N 5/2252; H04N 5/2256; H04N 5/2253; G03B 17/563; G03B 11/045
See application file for complete search history.

(56) References Cited

U.S. PATENT DOCUMENTS

| 5,015,833 A | 5/1991 | Shepard et al. |
| 2003/0029917 A1* | 2/2003 | Hennick ............ G06K 7/10732 235/454 |

FOREIGN PATENT DOCUMENTS

| EP | 3043288 A1 | 7/2016 | |
| WO | WO 9534988 A2 * | 12/1995 | ....... G08B 13/19619 |

OTHER PUBLICATIONS

Search Report for UK Patent Application No. 1706212.6 dated Oct. 10, 2017.

* cited by examiner

*Primary Examiner* — Sonji Johnson
(74) *Attorney, Agent, or Firm* — Yuri Astvatsaturov

(57) ABSTRACT

An imaging module for reading targets by image capture is mounted as a unitary assembly within an imaging reader. An imager is mounted on a first printed circuit board (PCB), and an interface connector is mounted on a second PCB. The first PCB is in direct, surface-area contact with first chassis walls of a chassis and is positioned to lie in a generally upright, first predetermined plane. The second PCB is in direct, surface-area contact with second chassis walls of the chassis and is positioned to lie in a generally tilted, second predetermined plane that is inclined at a tilt angle relative to the first predetermined plane. The first and second chassis walls are constituted as a one-piece support that maintains the tilt angle between the PCBs.

20 Claims, 20 Drawing Sheets

IMAGING MODULE FOR SUPPORTING PRINTED CIRCUIT BOARDS IN A PREDETERMINED ANGULAR RELATIONSHIP INSIDE AN IMAGING READER, AND METHOD OF ASSEMBLY

BACKGROUND OF THE INVENTION

The present disclosure relates generally to an imaging module mountable inside an imaging reader for reading targets, such as bar code symbols, to be electro-optically read by image capture over a field of view, and, more particularly, to supporting a plurality of printed circuit boards on which electro-optical reading and/or interfacing components are mounted to lie in predetermined planes in a predetermined angular relationship on the module, and, still more particularly, to a method of assembling the module, and of mounting the assembled module as a unitary assembly in the reader.

Solid-state imaging readers have long been used, in both handheld and hands-free modes of operation, in many industries, such as retail, manufacturing, warehousing, distribution, postal, transportation, logistics, etc., to electro-optically read targets, such as one- or two-dimensional bar code symbols to be decoded. A known imaging reader generally includes an imaging module, also known as a scan engine, mountable in the reader and having a chassis on which an engine printed circuit board (PCB) is mounted. A solid-state imager for capturing an image of a target along an imaging axis over a field of view is mounted on the engine PCB. For optical reasons, it is desirable for the imager to directly face the target with its imaging axis generally horizontal, and to lie in a generally upright or vertical plane, to thereby maximize imaging performance since lying in any other plane could tend to defocus the captured image. Typically, an aiming light source, which directs one or more visible aiming lights along respective aiming axes to the target to visually locate the target, is also mounted on the engine PCB, and an illuminating light source, which emits one or more illuminating lights along respective illuminating axes toward the target to illuminate the target, especially in dimly lit environments, is mounted either on the engine PCB, or somewhere else on the chassis. For optical reasons, it is also desirable for the aiming light source and/or the illuminating light source to directly face the target with their respective aiming and/or illuminating axes generally horizontal, and to lie in a generally upright or vertical plane, to thereby maximize the amount of aiming and/or illuminating light that is directed to the target, and to avoid excessive light corrections with aiming and/or illuminating lenses. When the imager, the aiming light source and/or the illuminating light source are all surface-mounted on the same engine PCB such that their imaging, aiming and/or illuminating axes are generally perpendicular to the engine PCB, then the engine PCB is typically supported on the chassis to lie in the generally upright or vertical plane.

It is known to configure the handheld imaging reader with a generally gun-shaped configuration having a handle that, for ergonomic reasons, extends along a handle axis that is typically tilted at a tilt angle of around fifteen to about twenty-two degrees with respect to the vertical. Rather than not occupy and waste the available space inside the handle, another PCB, also known as a handle or control or decode PCB, is mounted inside, and extends along the handle axis of, the handle. The handle PCB advantageously supports other electro-optical reading components, such as a controller or processor for controlling the imager, the aiming light source and the illuminating light source, and for processing the captured image. The handle PCB also supports an electrical interface connector at a lower end of the handle PCB adjacent a bottom of the handle, for connection to electrical power/data cables, as well as an indicating light source at an upper end of the handle PCB adjacent a top of the handle for visually indicating when a successful reading of the target has been performed. The handle PCB is mounted at the tilt angle relative to the engine PCB by using separate mounting brackets or frames that are individually secured in place to the chassis.

Although generally satisfactory for their intended purpose, the mounting brackets that are used to hold the engine PCB and the handle PCB at the tilt angle are relatively cumbersome to mount on the chassis, impede and delay the assembly of the module, and represent a non-negligible expense, not only in terms of manufacture and inventory maintenance of additional components, but also in terms of assembly and installation. The mounting brackets could, under certain circumstances, e.g., if the reader is dropped and subjected to a high shock force, break loose, in which case, undesirable motion between the PCBs might result, and, in a worst case, the required predetermined angular relationship between the engine PCB and the handle PCB might not be maintained, and, as a result, reading performance could be degraded.

Accordingly, it would be desirable to avoid the use of mounting brackets, to make the reader more resistant to shock impacts, and to simplify, expedite, and reduce the cost of, assembling the module.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
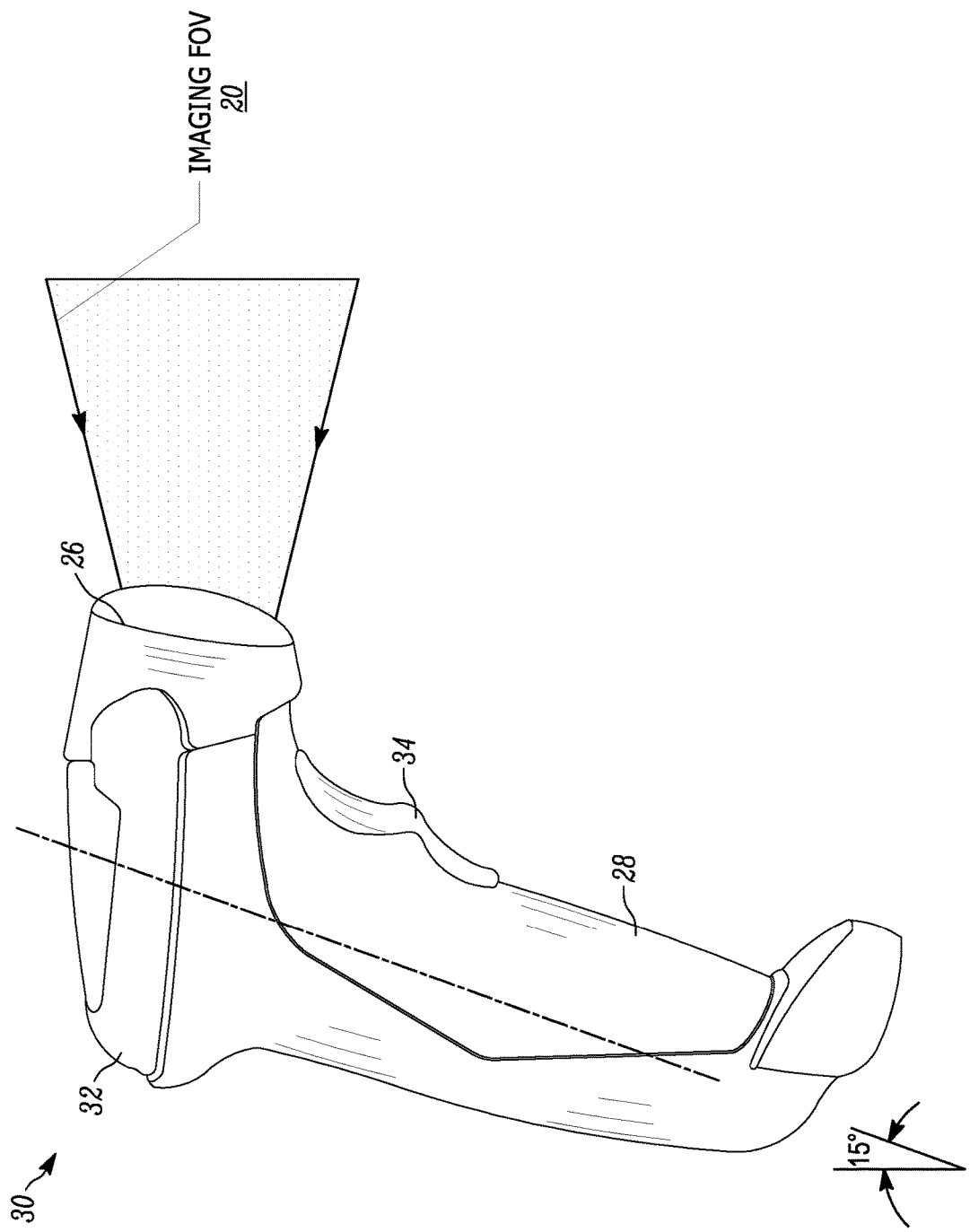
FIG. 1 is a side view of an exemplary embodiment of an electro-optical handheld reader that reads targets by image capture, and that contains an imaging module in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The imaging module, the imaging reader, and the method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an imaging module is operative for reading a target, e.g., a bar code symbol, by image capture. The module includes a first or engine printed circuit board (PCB), and an imaging system having an imager, e.g., a charge coupled device (CCD) array or a complementary metal oxide semiconductor (CMOS) array of cells or sensors, mounted on the first PCB, for capturing an image of the target over a field of view. The module also includes a second or handle PCB, and an interface connector mounted on the second PCB. The module further includes a chassis having first chassis walls in direct, surface-area contact with the first PCB, for supporting the imager, and for automatically positioning the first PCB, to lie in a generally upright, first predetermined plane, and second chassis walls in direct, surface-area contact with the second PCB, for supporting the interface connector, and for automatically positioning the second PCB to lie in a generally tilted, second predetermined plane that is inclined at a tilt angle, preferably an acute angle on the order of fifteen degrees, relative to the first predetermined plane. The first and second chassis walls are constituted as a one-piece support that maintains the tilt angle or predetermined angular relationship between the PCBs. The module is mounted as a unitary assembly in the interior of a housing of an imaging reader, which is preferably configured as a portable, point-of-transaction, gun-shaped, handheld housing having an elongated handle in which the second PCB is received lengthwise of the handle.

Preferably, the module includes an aiming light system having one or more aiming light sources mounted on the first PCB. The chassis has interior compartments in which the imager and each aiming light source are respectively contained. Advantageously, the module includes an illuminating light system having one or more illuminating light sources mounted on the first PCB. The chassis has interior compartments in which the imager and each illuminating light source are respectively contained. In a variant construction, each illuminating light source is mounted on a third PCB, which is in direct contact with third chassis walls of the chassis and is supported and positioned in a generally upright, third predetermined plane that is either coplanar, or generally parallel, with the first predetermined plane.

The first PCB may have a pair of first cutouts, and the chassis may have a first pair of locating posts received in the first cutouts for positioning the first PCB to lie in the first predetermined plane, and a first pair of PCB fasteners for securing the first PCB to fixedly stay in the first predetermined plane. In addition, the second PCB may have a pair of second cutouts, and the chassis may have a second pair of locating posts received in the second cutouts for positioning the second PCB to lie in the second predetermined plane, and a second pair of PCB fasteners for securing the second PCB to fixedly stay in the second predetermined plane. The chassis may have a pair of lugs that extends in opposite directions away from each other, and a pair of housing fasteners that extend through openings in the lugs for fixedly mounting the chassis in the imaging reader. A light-transmissive window may be positioned in direct contact with the chassis, and a hood may surround the window, in which case, the chassis advantageously has a plurality of hooks that extend through openings in the hood for mounting the hood and the window on the chassis.

In accordance with another feature of this disclosure, a method of assembling an imaging reader for reading a target by image capture, is performed by assembling an imaging module by mounting an imager on a first printed circuit board (PCB); by mounting an interface connector on a second PCB; by supporting the imager, and by automatically positioning the first PCB, to lie in direct, surface-area contact with first chassis walls of a chassis in a generally upright, first predetermined plane; by supporting the interface connector, and by automatically positioning the second PCB, to lie in direct, surface-area contact with second chassis walls of the chassis in a generally tilted, second predetermined plane that is inclined at a tilt angle relative to the first predetermined plane; and by constituting the first and second chassis walls as a one-piece support that maintains the tilt angle or predetermined angular relationship between the PCBs. The assembled imaging module is then mounted as a unitary assembly into the reader.

The one-piece support of the chassis avoids the use of mounting brackets, and makes the reader more resistant to shock impacts. The first and second chassis walls automatically position the first and second PCBs to lie in their predetermined planes at the required predetermined angular relationship, thereby simplifying, expediting, and reducing the cost of assembling the module.

Turning now to the drawings, reference numeral 30 in FIG. 1 generally identifies an exemplary, ergonomic, handheld imaging reader for electro-optically reading targets, such as bar code symbols or like indicia, by image capture over an angular field of view (FOV) 20. The reader 30 is advantageously configured as a gun-shaped housing having an upper barrel or body 32, and a lower elongated handle 28 tilted rearwardly along a handle axis away from the body 32 at an acute or tilt angle of inclination, for example, an angle somewhere between twenty-two and fifteen degrees (as shown, fifteen degrees), relative to the vertical. The body 32 and handle 28 may be constructed of a lightweight, resilient, shock-resistant, self-supporting material, such as a synthetic plastic material. The plastic housing may be injection molded, but can also be vacuum-formed or blow-molded to form a thin hollow shell that bounds an interior space whose volume is sufficient to contain a scan engine or imaging module 40, as described in detail below in connection with FIGS. 2-20. A light-transmissive window 26 (see FIG. 2) is located inside, and environmentally seals, the body 32 and the interior of the housing. The imaging reader 30 is held in an operator's hand by the handle 28 and used in a handheld mode in which a forwardly-facing trigger 34 is manually depressed to initiate imaging of targets to be read in a range of working distances relative to the reader 30.

Figure 2:
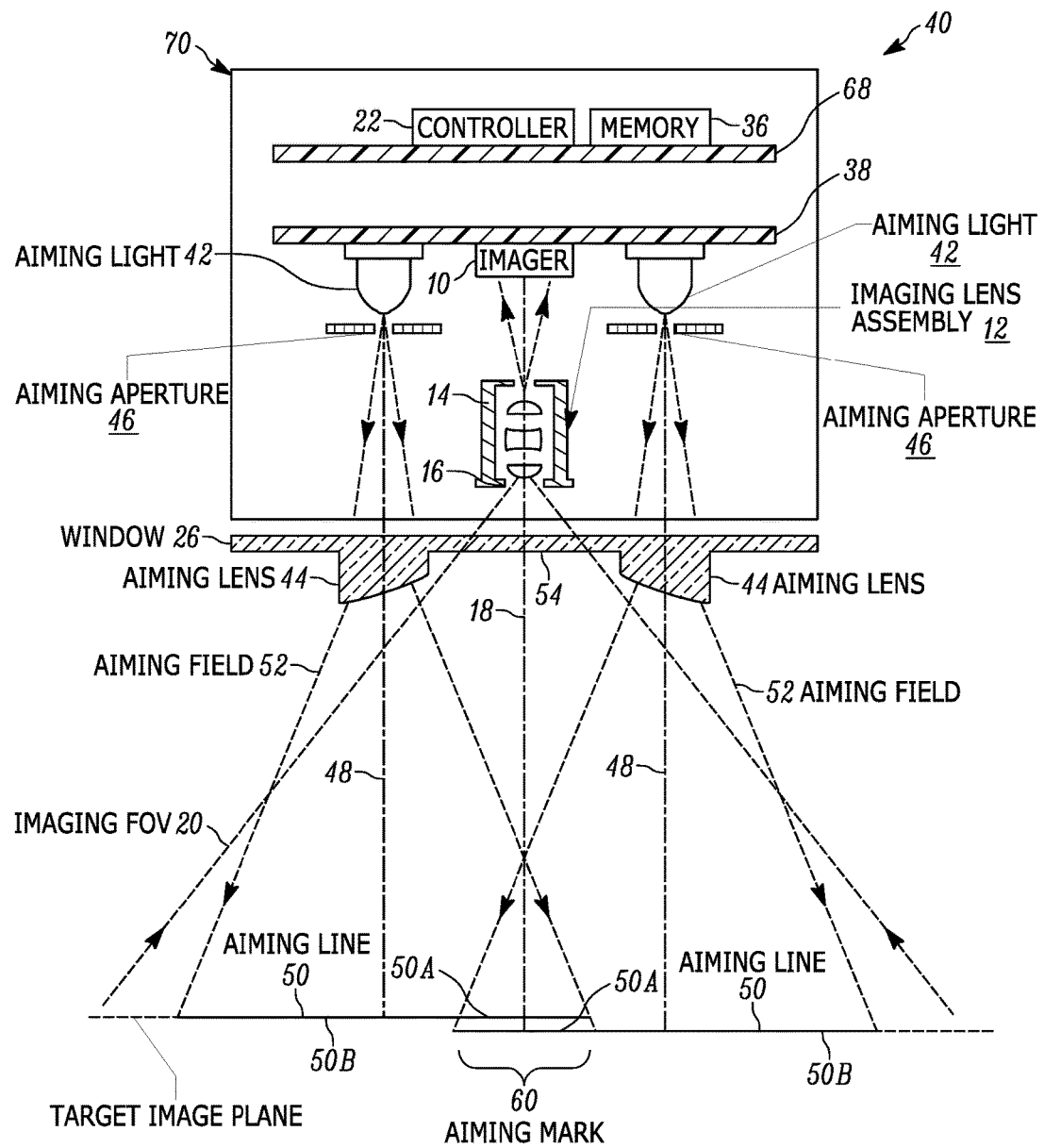
FIG. 2 is a diagrammatic view of electro-optical components of imaging and aiming light systems onboard the imaging module within the reader of FIG. 1.

As diagrammatically shown in FIG. 2, the imaging module 40 includes an imaging system having a solid-state imager 10 mounted on a generally planar, engine printed circuit board (PCB) 38, which is supported on a chassis 70 of the module 40, as described below, and an imaging lens assembly 12 mounted in a tubular holder 14 that has a circular aperture 16. The imager 10 is a two-dimensional, charge coupled device (CCD) array or a complementary metal oxide semiconductor (CMOS) array of cells or sensors having either a global or a rolling shutter. For low cost reasons, a CMOS imager may be advantageously used with a rolling shutter. The imager 10 and imaging lens 12 are preferably aligned along a centerline or an optical imaging axis 18 that is generally centrally located within the upper body 32 of the housing, and that is generally perpendicular to the engine PCB 38.

In operation, the imaging system captures return light passing through an upper central zone 54 of the window 26 along the imaging axis 18 centered in the imaging field of view 20 of the imaging lens assembly 12 from the target located in a range of working distances away from the window 26. The imager 10 is advantageously positioned closer to a rear wall of the upper body 32 in order to enlarge the imaging field of view 20 in the near range of working distances close to the reader 30. The imaging lens assembly 12 preferably comprises one or more fixed-focus lenses, preferably a Cooke triplet, having an imaging plane at which the target is best focused and imaged onto the imager 10. The field of view 20 is generally rectangular and extends along a horizontal X-axis and a vertical Y-axis that are both generally perpendicular to the imaging axis 18. The sensors produce electrical signals corresponding to a two-dimensional array of pixel information for an image of the target. The electrical signals are processed by a controller or programmed processor 22 into data indicative of the target being read. The controller 22 is connected to a memory 36 for data retrieval and storage. The controller 22 and the memory 36 may be mounted on the engine PCB 38 or, advantageously, on a generally planar, handle PCB 68, which is also supported on the chassis 70 of the module 40, as described below.

The imaging system is capable of acquiring a full image of the target under various lighting conditions. An illuminating system, as described below, may also be mounted on the module 40 to provide illuminating light to illuminate the target. Exposure time is controlled by the controller 22. Resolution of the array can be of various sizes although a VGA resolution of 640×480 pixels may be used to minimize cost.

Figure 3:
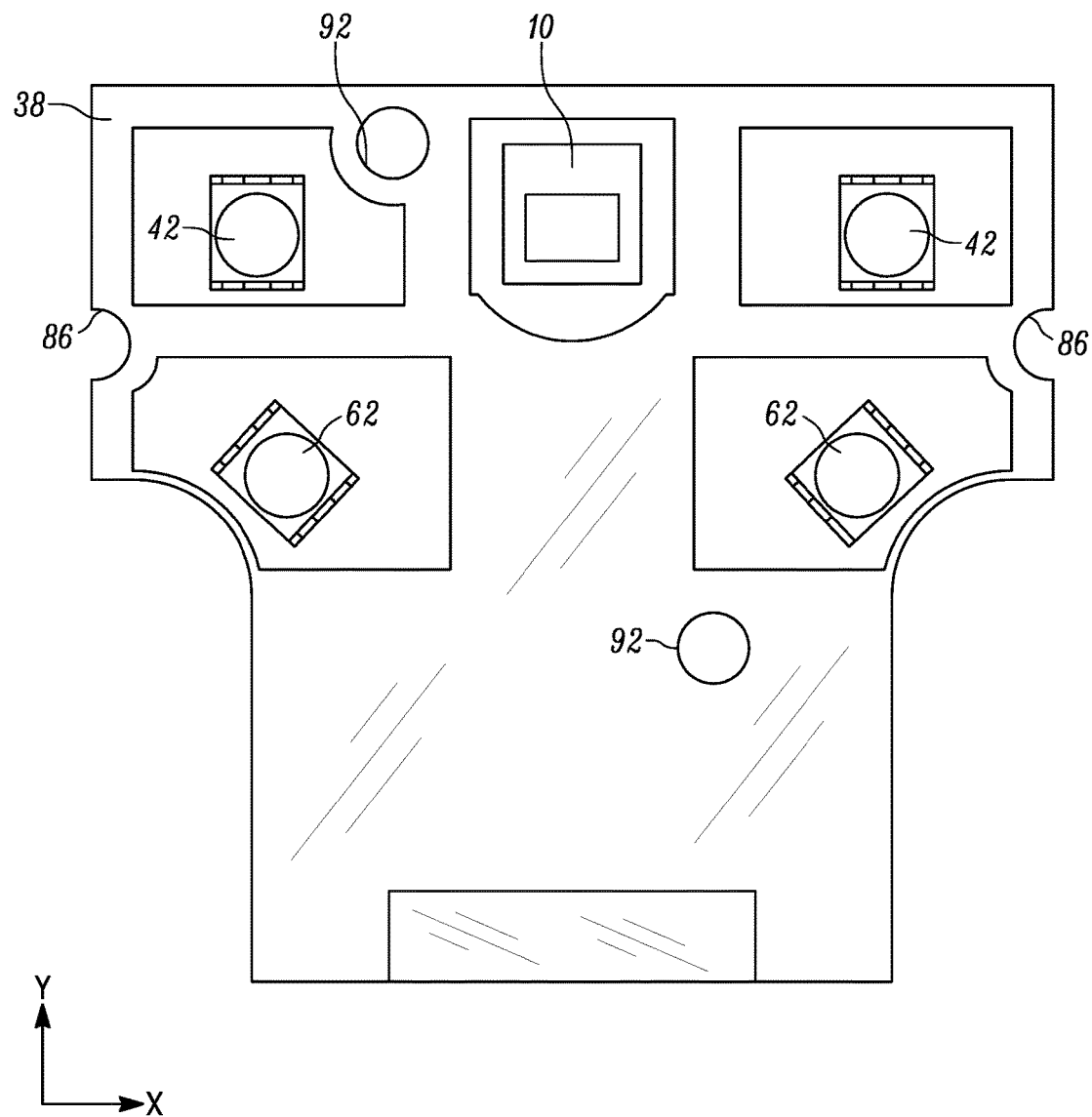
FIG. 3 is an enlarged, front elevational view of an imager, a pair of aiming light sources, and a pair of illuminating light sources mounted on an engine PCB to be supported by the imaging module.

An aiming system, including one or more aiming light assemblies, is supported on the module 40, and is offset from the imaging system. The aiming system is operative for projecting on the target an aiming mark 60 (see FIG. 2). The aiming light assemblies are spaced apart along the horizontal X-axis at opposite sides of the imaging sensor 10. Each aiming light assembly includes an aiming light source or emitter, e.g., a light emitting diode (LED) 42, mounted on the engine PCB 38; a generally linear aiming aperture 46 that extends along the horizontal X-axis in front of the respective LED 42; and an aiming lens 44, preferably a toroidal lens, mounted away from its respective LED 42 and, as described below, is preferably integrated with the window 26. Each aiming LED 42, aiming lens 44 and aiming aperture 46 are centered and lie along a respective aiming axis 48. The aiming axes 48 generally lie in a common plane and are generally parallel to one another. As shown in FIG. 3, the aiming LEDs 42 and the sensor 10 are mounted along a common horizontal X-axis, but this need not be the case, since the aiming LEDs 42 can be mounted either above or below the imager 10. Advantageously, the imaging axis 18 lies in the same plane and is generally parallel to the aiming axes 48.

The aiming light assemblies are operative for directing the aiming light emitted from each aiming LED 42 through the respective aperture 46 and the respective aiming lens 44 along the respective aiming axis 48 over an angular aiming field 52 that is centered on the respective aiming axis 48 at the target. On the target, these aiming fields 52 describe a pair of aiming light lines 50, each having a predetermined brightness. The aiming light lines 50 are collinear along the horizontal X-axis. The aiming light lines 50 have inner linear end regions 50A that extend past the imaging axis 18 and that overlap on the target to form a bright, linear, aiming mark 60 having a brightness greater than the predetermined brightness due to the superposition of the inner linear end regions 50A to visually indicate a center area of the field of view 20 over the range of working distances. Thus, the operator can position the aiming mark 60 on the target, and the target will be substantially centered in the imaging field of view 20. The aiming light lines 50 also have outer linear end regions 50B that extend along the horizontal X-axis toward, and that visually indicate, approximate boundary zones or end limits of the field of view 20 over the range of working distances. Thus, the operator is guided to position the outer linear end regions 50B on the target, such that the target will be substantially contained entirely within the imaging field of view 20.

Figure 13:
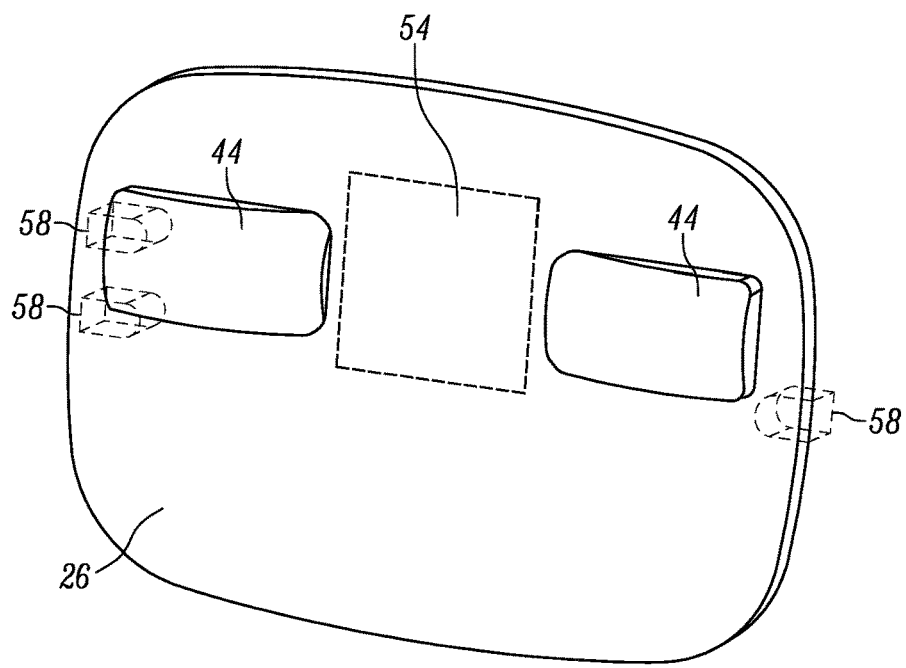
FIG. 13 is a front, perspective view of one embodiment of a window in isolation to be positioned against the chassis of FIG. 7.
Figure 14:
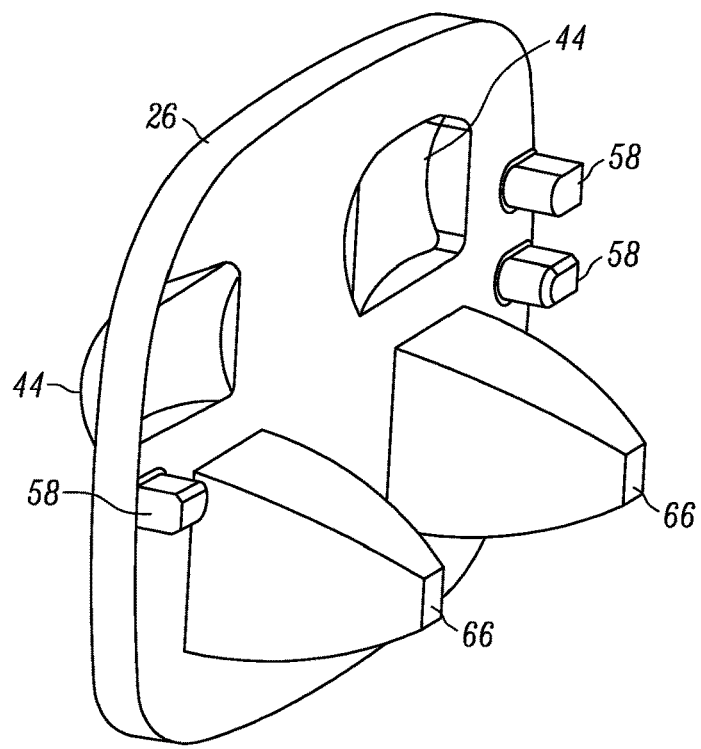
FIG. 14 is a rear, perspective view of another embodiment of the window in isolation.
Figure 15:
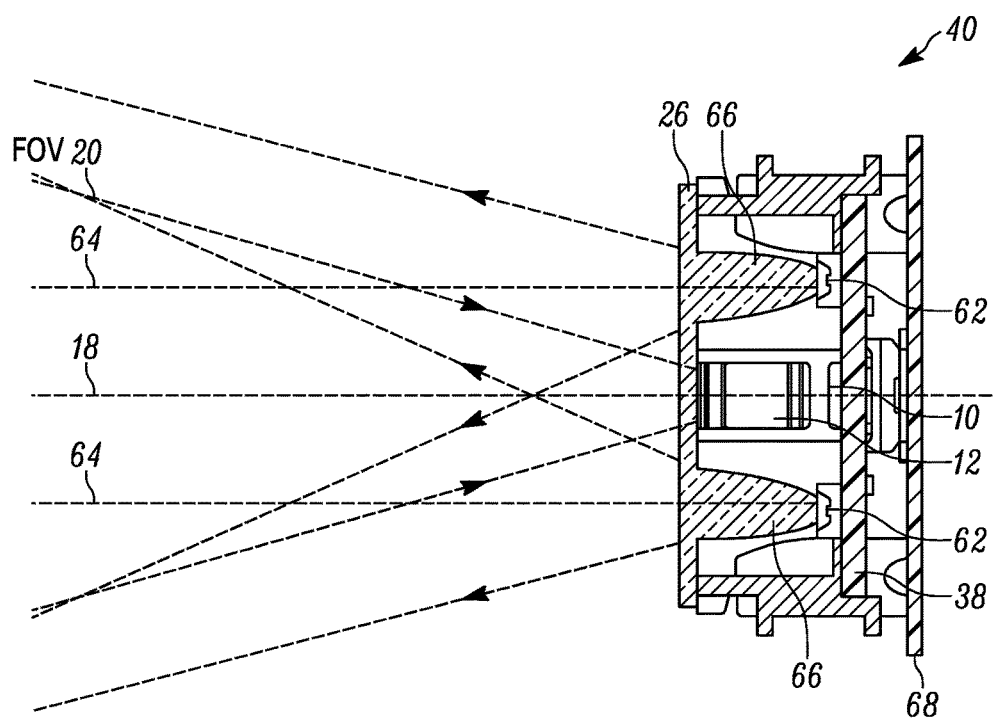
FIG. 15 is a top, sectional view of components of the imaging and illuminating light systems of the imaging module.
Figure 16:
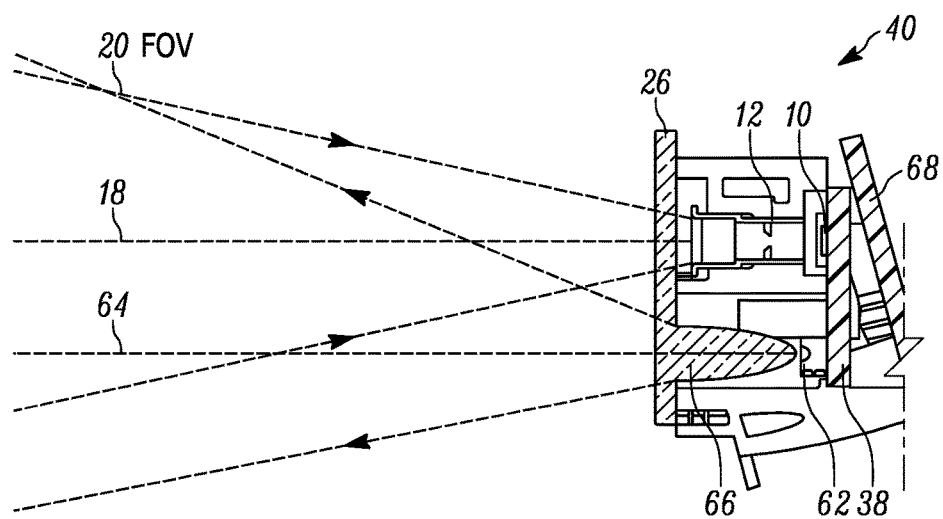
FIG. 16 is a side, sectional view of components of the imaging and illuminating light systems of the imaging module.

As best seen in FIGS. 13-14, the aiming lenses 44 are formed of one-piece construction with the window 26 at opposite sides of, and away from, the upper central zone 54 through which the image of the target is captured. The window 26 and the aiming lenses 44 may be constituted of glass and/or molded plastic materials. Thus, the window 26 may be made of glass and each aiming lens 44 may be made of the same glass. Alternatively, the window 26 may be made of plastic and each aiming lens 44 may be made of the same plastic. In other variations, the window 26 may be made of glass and each aiming lens 44 may be made of plastic that is deposited or molded onto the glass in a process known as overmolding or replication, or vice versa, in which the window 26 may be made of plastic and each aiming lens 44 may be made of glass that is molded into the plastic. Although the aiming lenses 44 are shown on the outer surface of the window 26, they can also be formed on the inner surface of the window 26. Thus, the aiming lenses 44 are integral with the window 26, thereby reducing the total number of components to be individually fabricated, installed and aligned.

Figure 19:
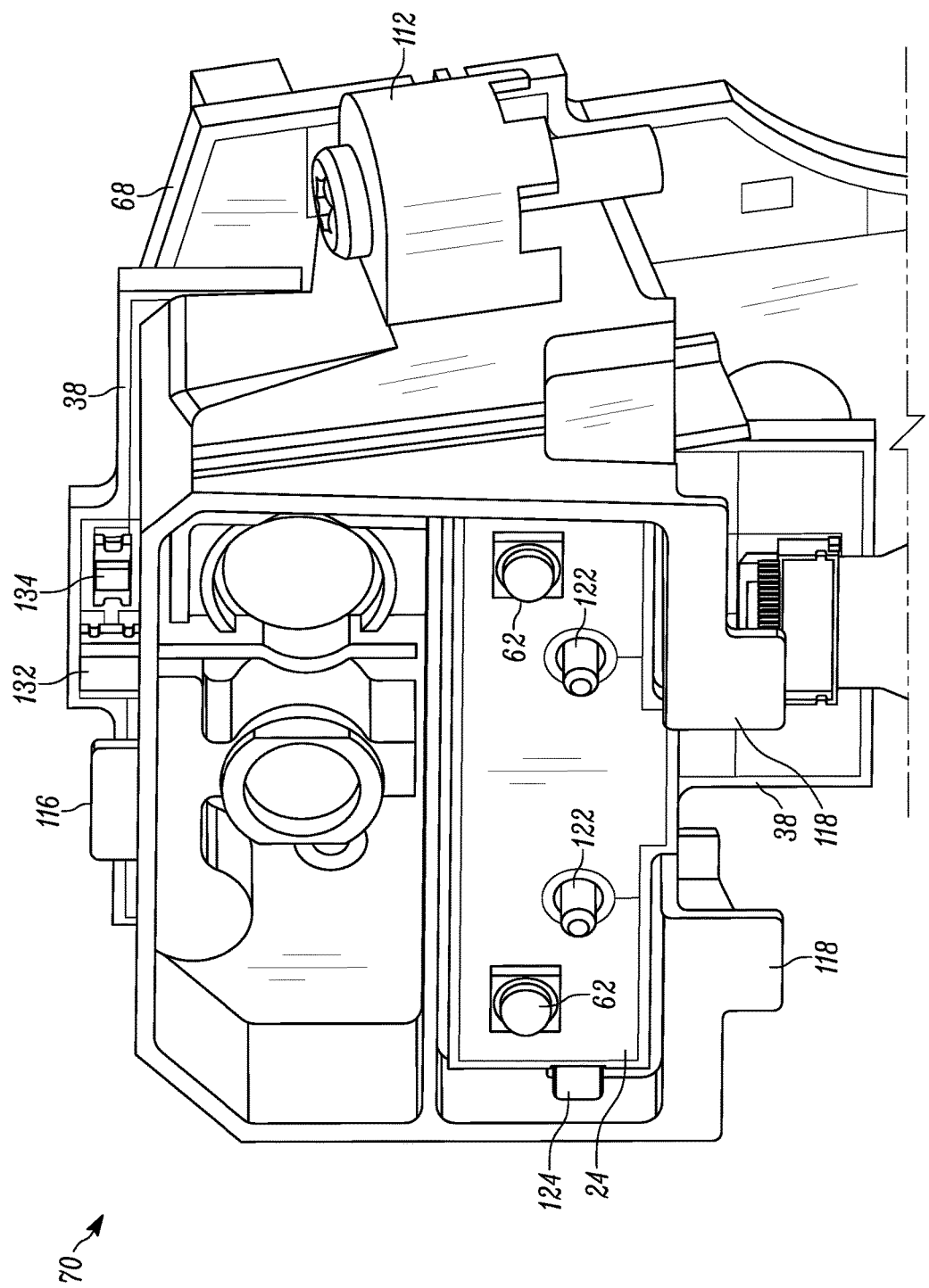
FIG. 19 is a broken-away, front, perspective view of a variant of the imaging module on which the illuminating light sources are mounted on a separate PCB.

As shown in FIGS. 3-4, 6, and 15-16, the reader 30 may also include an illuminating light system, e.g., one or more illuminating light sources or emitters, such as light emitting diodes (LEDs) 62, mounted on the engine PCB 38. As best shown in FIG. 3, the aiming light sources 32, the illuminating light sources 62, and the imager 10 are all surface-mounted on the same engine PCB 38. In a variant construction, as shown in FIG. 19, the illuminating light sources 62 could be mounted on a separate PCB 24 that preferably is coplanar, or generally parallel with, the engine PCB 38. Each illuminating LED 62 is operative for illuminating the target by emitting illuminating light over an illumination angle centered on an illumination axis 64 toward the target for reflection and scattering therefrom. Each illuminating LED 62 is advantageously provided with an optical element, such as a compound parabolic reflector (CPR) 66 to uniformly and efficiently illuminate the target with an illuminating light pattern. Each CPR 66 is preferably integrated with the window 26 and is configured to receive, and to optically modify, the illuminating light emitted from each illuminating LED 62 to generate a generally uniform and efficient illumination light pattern, preferably of generally rectangular shape, that is substantially congruent to, and substantially overlaps, the field of view 20, again preferably of generally rectangular shape, along both the X- and Y-axes depicted in FIG. 3. Each CPR 66 has a first pair of parabolic segments that are located at opposite sides of the illumination axis 64 for reflecting the emitted illuminating light over a first illumination angle along the X-axis, and a second pair of parabolic segments that are also located at opposite sides of the illuminating axis 64 for reflecting the emitted illuminating light over a second illumination angle along the Y-axis. Each CPR 66 is advantageously a solid element, e.g., a molded plastic, whose interior surfaces reflect and guide the illuminating light away from each illuminating LED 62 with total internal reflection. Each CPR 66 could also be a hollow element.

As best seen in FIG. 14, the CPRs 66 are formed of one-piece construction with the window 26 at opposite sides of, and below, the upper central zone 54 through which the image of the target is captured. The window 26 and the CPRs 66 may be constituted of glass and/or molded plastic materials. Thus, the window 26 may be made of glass and each CPR 66 may be made of the same glass. Alternatively, the window 26 may be made of plastic and each CPR 66 may be made of the same plastic. In other variations, the window 26 may be made of glass and each CPR 66 may be made of plastic that is deposited or molded onto the glass in a process known as overmolding or replication, or vice versa, in which the window 26 may be made of plastic and each CPR 66 may be made of glass that is molded into the plastic. Although the CPRs 66 are shown on the inner surface of the window 26, they can also be formed on the outer surface of the window 26. Thus, the CPRs 66 are integral with the window 26, thereby reducing the total number of components to be individually fabricated, installed and aligned.

Figure 4:
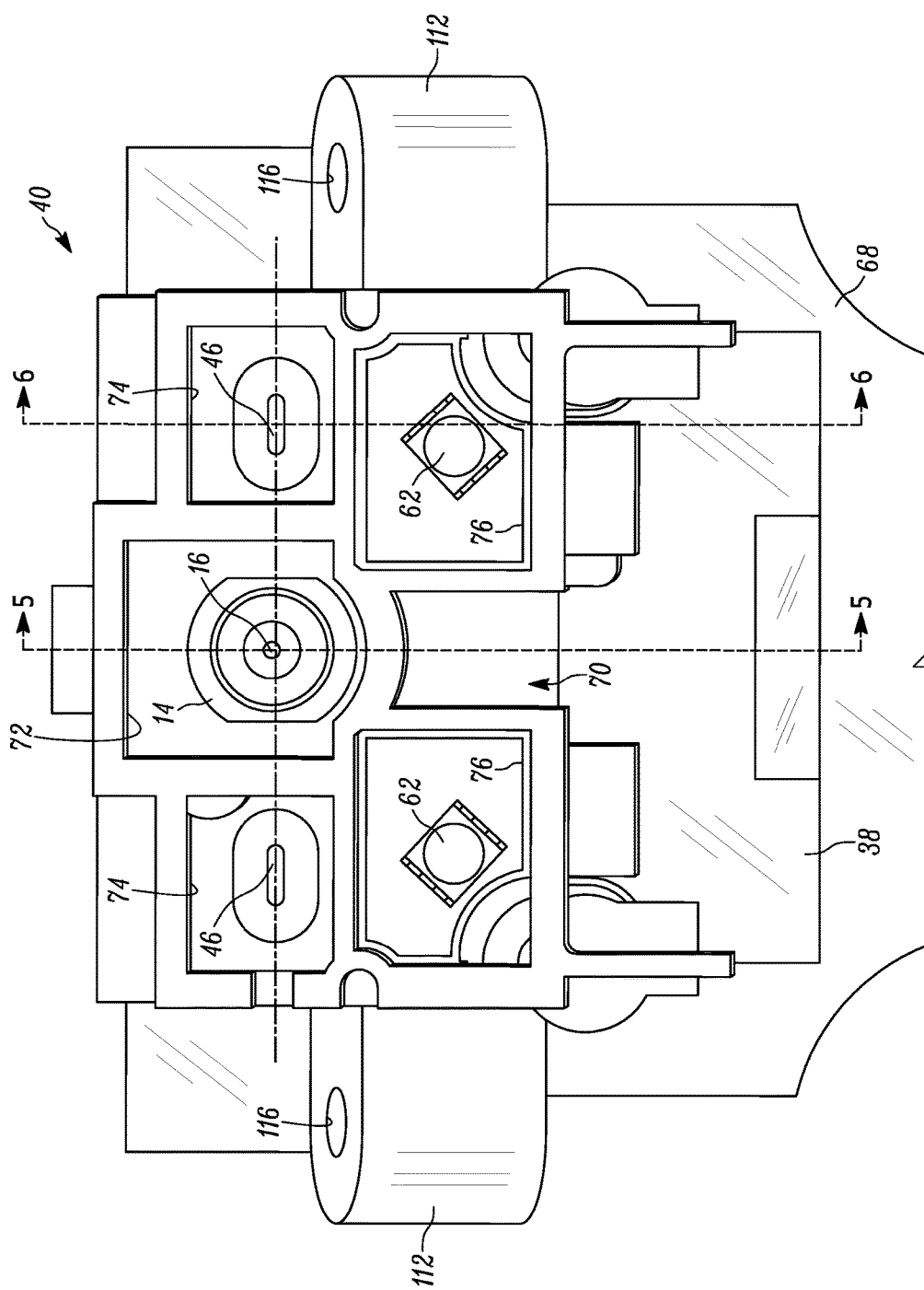
FIG. 4 is a front elevational view of a chassis on which the engine PCB of FIG. 3 and a handle PCB have been mounted.
Figure 5:
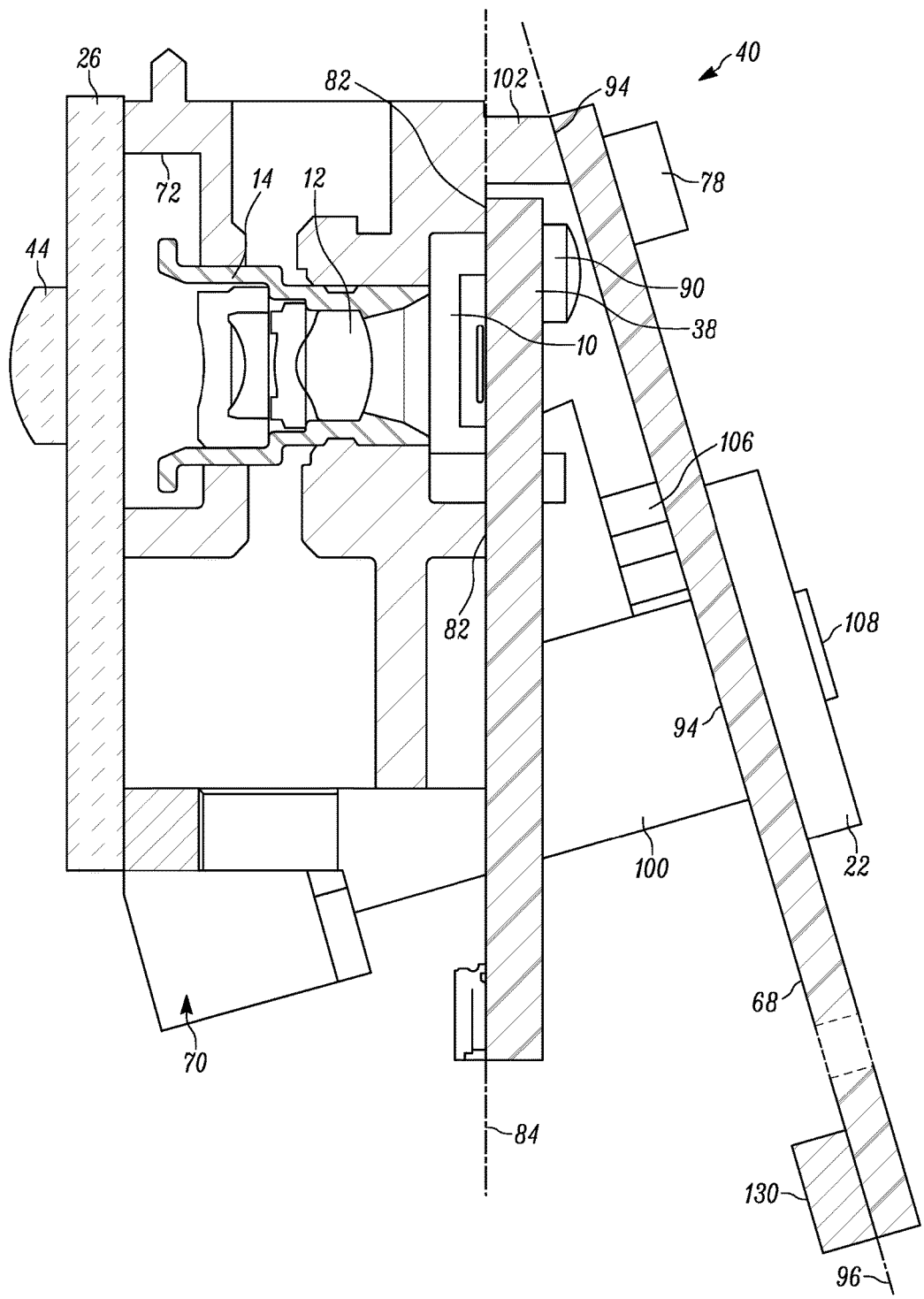
FIG. 5 is an enlarged, sectional view taken on line 5-5 of FIG. 4.
Figure 6:
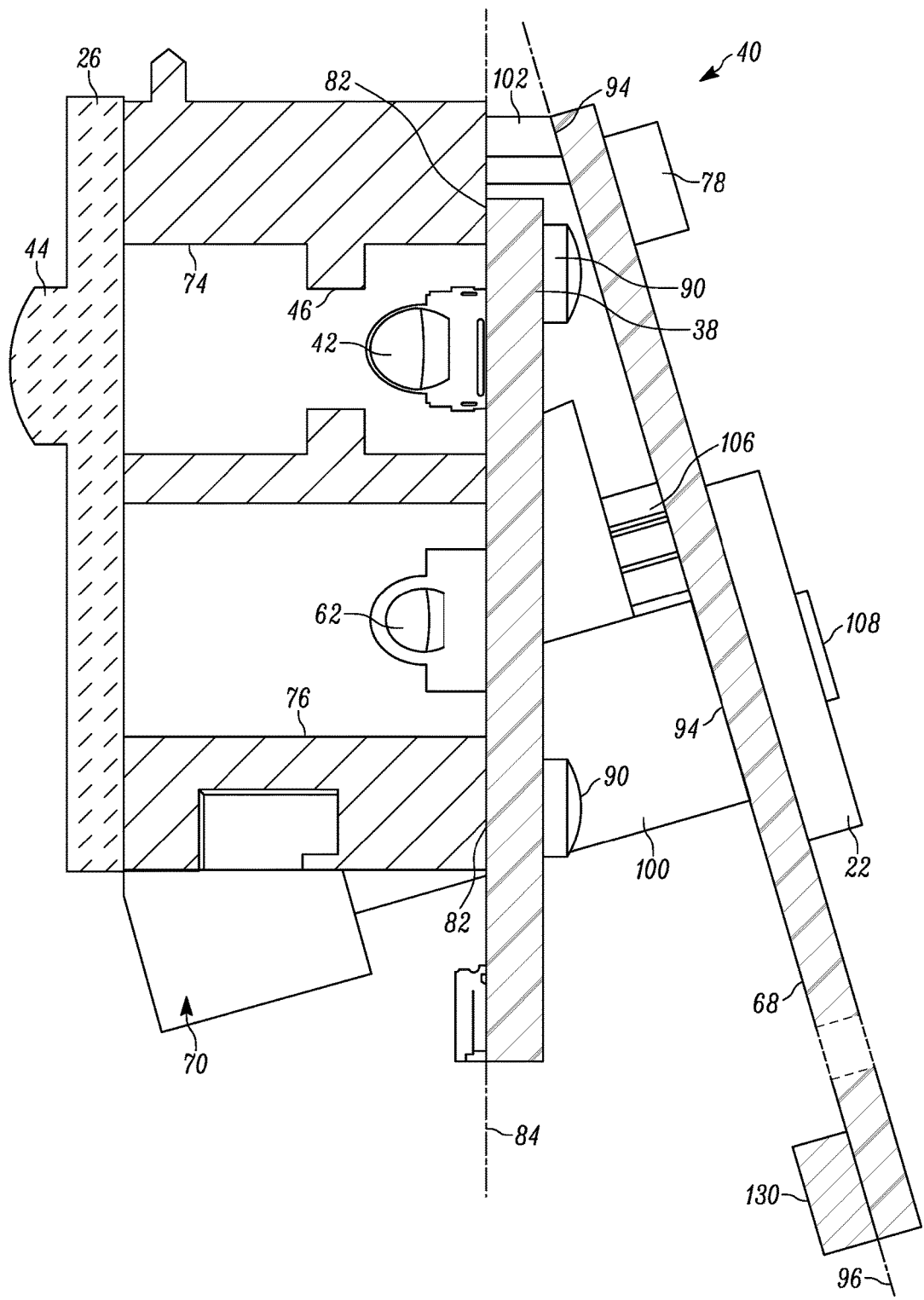
FIG. 6 is an enlarged, sectional view taken on line 6-6 of FIG. 4.
Figure 7:
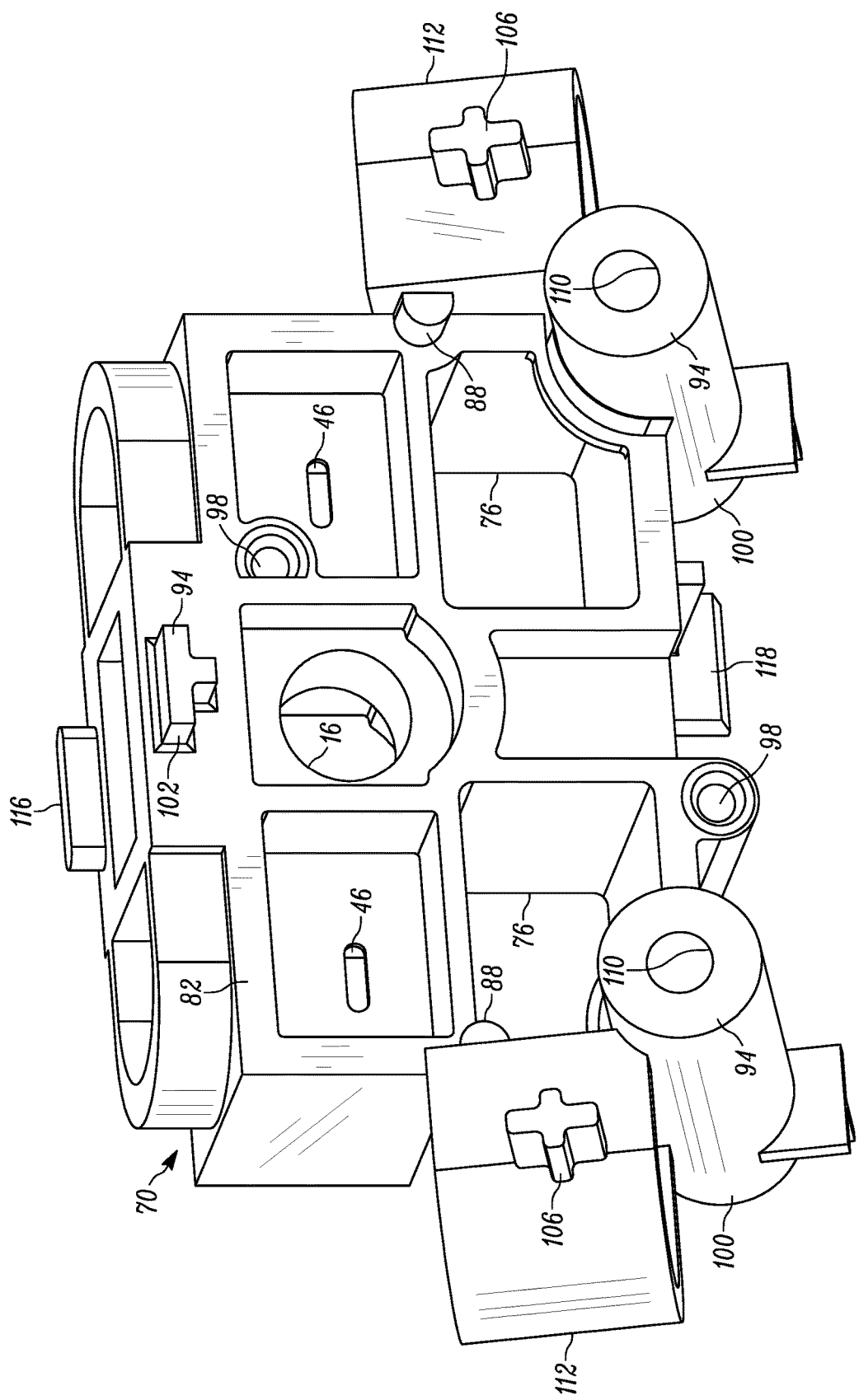
FIG. 7 is a rear, perspective view of one embodiment of the chassis of FIG. 4 in isolation.

In accordance with this disclosure, as shown in FIG. 4, the chassis 70 has chassis walls bounding a plurality of open interior compartments 72, 74, and 76. The imager 10 and the imaging lens assembly 12 are contained in the compartment 72. The aiming light sources 42 and the aiming light apertures 46 are respectively contained in a pair of the compartments 74. The illuminating light sources 62 are respectively contained in a pair of the compartments 76. The imager 10, the aiming light sources 42, and the illuminating light sources 62 are all mounted on the same engine PCB 38, also sometimes described herein as a first PCB, which, as shown in FIGS. 5-7, is supported in direct, surface-area contact with generally planar, first chassis walls 82 of the chassis 70 to lie in a generally upright, first predetermined plane 84. For optical reasons, it is desirable for the imager 10 to be oriented to lie along the first predetermined plane 84, which is generally perpendicular to the imaging axis 18, to maximize imaging performance since lying in any other plane could tend to defocus the captured image. For optical reasons, it is also desirable for the aiming light sources 42 and/or the illuminating light sources 62 to also be oriented to lie along the first predetermined plane 84, which is generally perpendicular to the imaging axis 18, to maximize the amount of light that is directed to the target and to avoid excessive light corrections with the aiming lenses 44 and/or any illuminating lenses.

Figure 8:
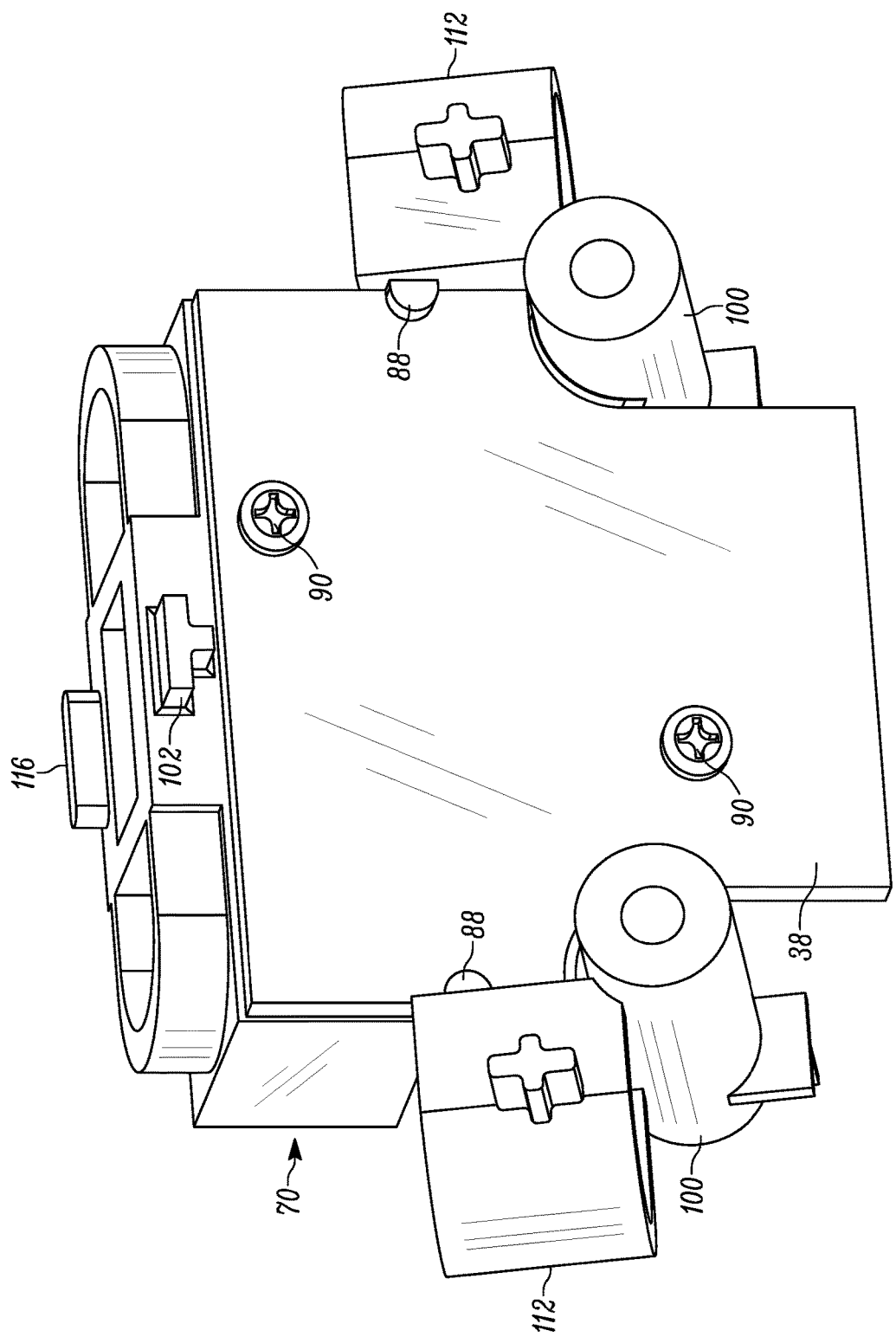
FIG. 8 is a rear, perspective view of the chassis of FIG. 7 after the engine PCB has been mounted thereon.

As shown in FIG. 3, the engine PCB 38 has a pair of first side cutouts 86, and a first pair of openings 92. As shown in FIG. 8, the chassis 70 has a first pair of locating posts 88 received in the first cutouts 86 for accurately registering and positioning the engine PCB 38 to lie in the first predetermined plane 84, and a first pair of PCB fasteners 90 extending through the openings 92 to secure the engine PCB 38 to fixedly stay in the first predetermined plane 84 by threading the PCB fasteners 90 into threaded bores 98 (see FIG. 7).

An interface electrical connector 130 is mounted at a lower end of the handle PCB 68 adjacent a bottom of the handle 28, for connection to electrical power/data cables. As previously mentioned, the controller 22 may also be mounted on the handle PCB 68, also known as a control or decode PCB and sometimes described herein as a second PCB. As shown in FIGS. 5-7, the handle PCB 68 is supported in direct, surface-area contact with generally planar, second chassis walls 94 of the chassis 70 to lie in a generally tilted, second predetermined plane 96 that is inclined at a tilt angle relative to the first predetermined plane 84. For ergonomic reasons, in order to best use the available space within the handle 28, the handle PCB 68 extends along the handle axis, which, as described above, is typically tilted at the tilt angle of around fifteen to about twenty-two degrees with respect to the vertical. A pair of cylindrical bosses 100 extend rearwardly of a lower region of the chassis 70 and terminate in a pair of lower end faces that are inclined at the tilt angle. A T-shaped support 102 extends rearwardly of an upper region of the chassis 70 and terminates in an upper end face that is inclined at the tilt angle. The upper and lower end faces lie along the second predetermined plane 96 and constitute the second chassis walls 94.

Figure 9:
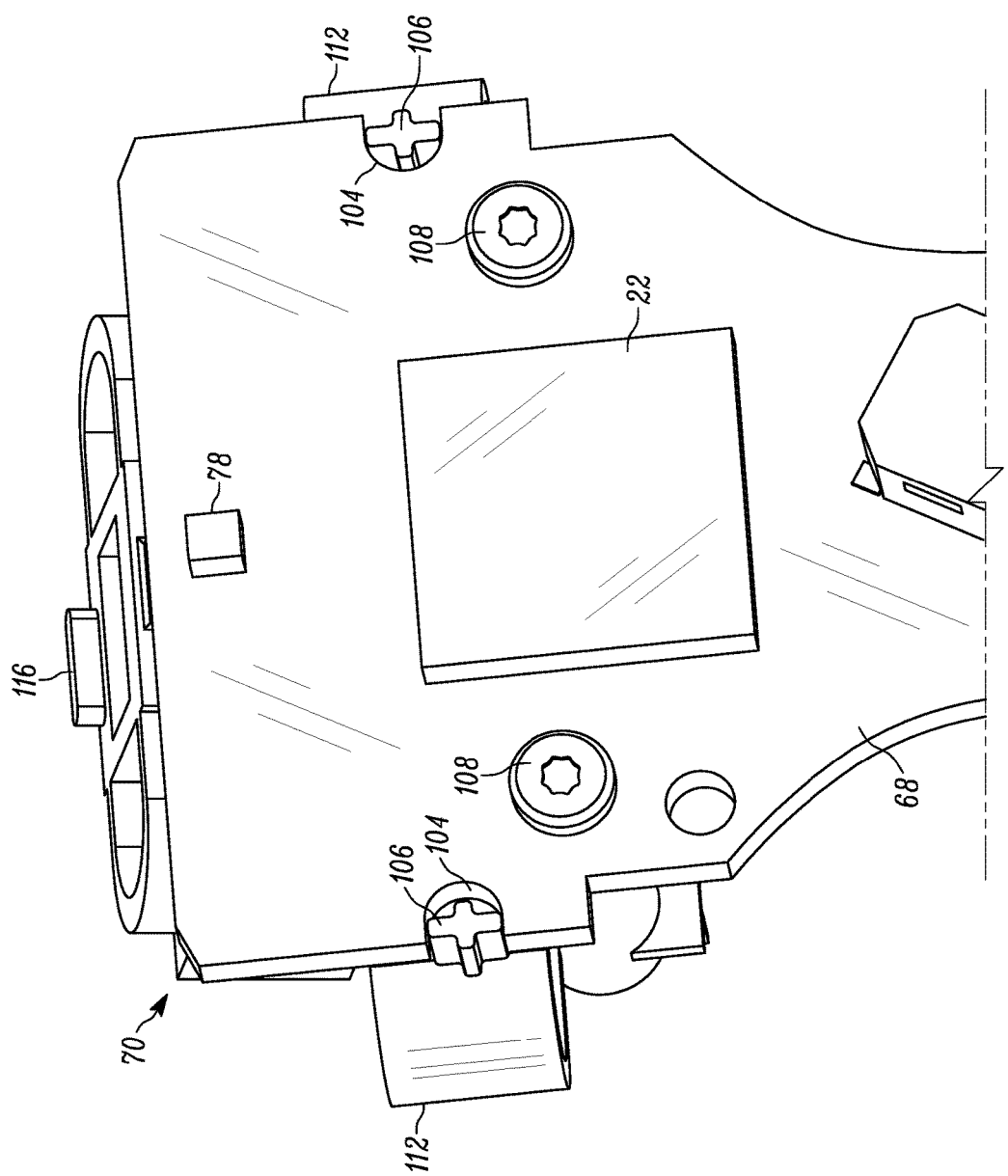
FIG. 9 is a rear, perspective view of the chassis of FIG. 7 after the handle PCB has been mounted thereon.

As shown in FIG. 9, the handle PCB 68 has a pair of second side cutouts 104, and the chassis 70 has a second pair of locating posts 106 received in the second cutouts 104 for accurately registering and positioning the handle PCB 68 to lie in the second predetermined plane 96, and a second pair of PCB fasteners 108 extending through openings in the handle PCB 68 to secure the engine PCB 38 to fixedly stay in the second predetermined plane 96 by threading the PCB fasteners 108 into threaded bores 110 (see FIG. 7) in the cylindrical bosses 100.

Figure 10:
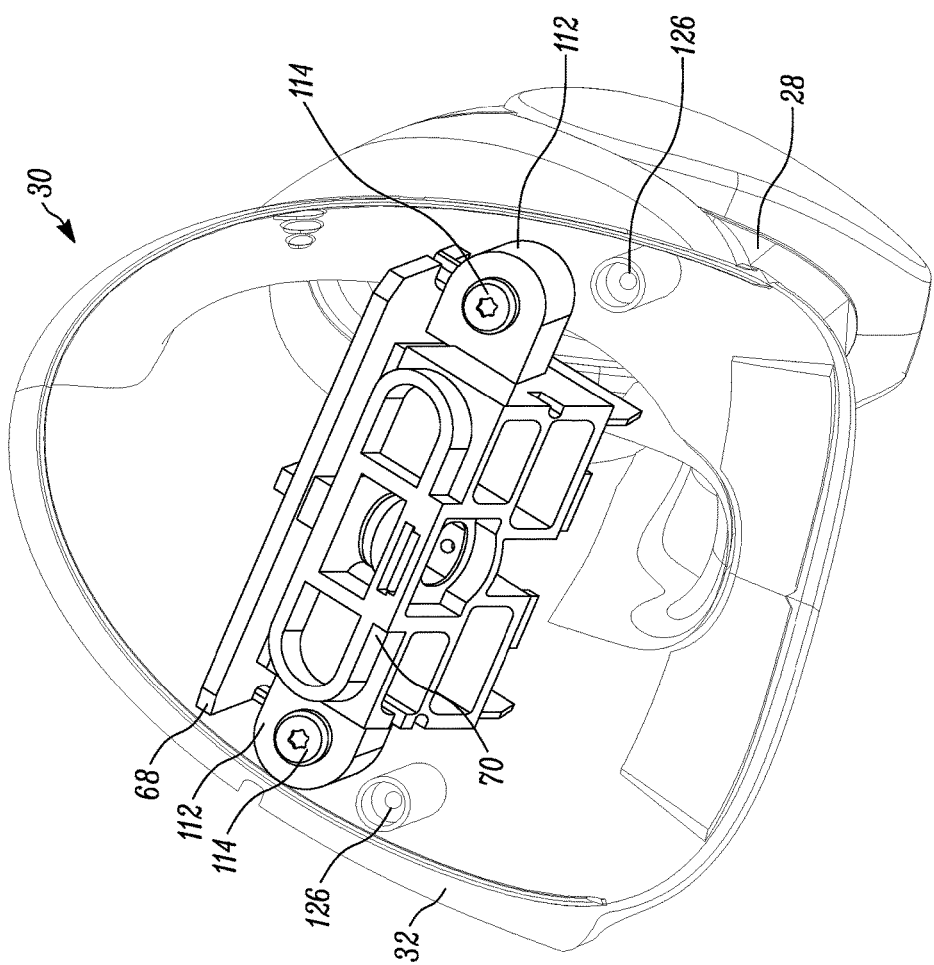
FIG. 10 is an overhead, exploded, perspective view of a part of the imaging module during its mounting inside the reader of FIG. 1.
Figure 11:
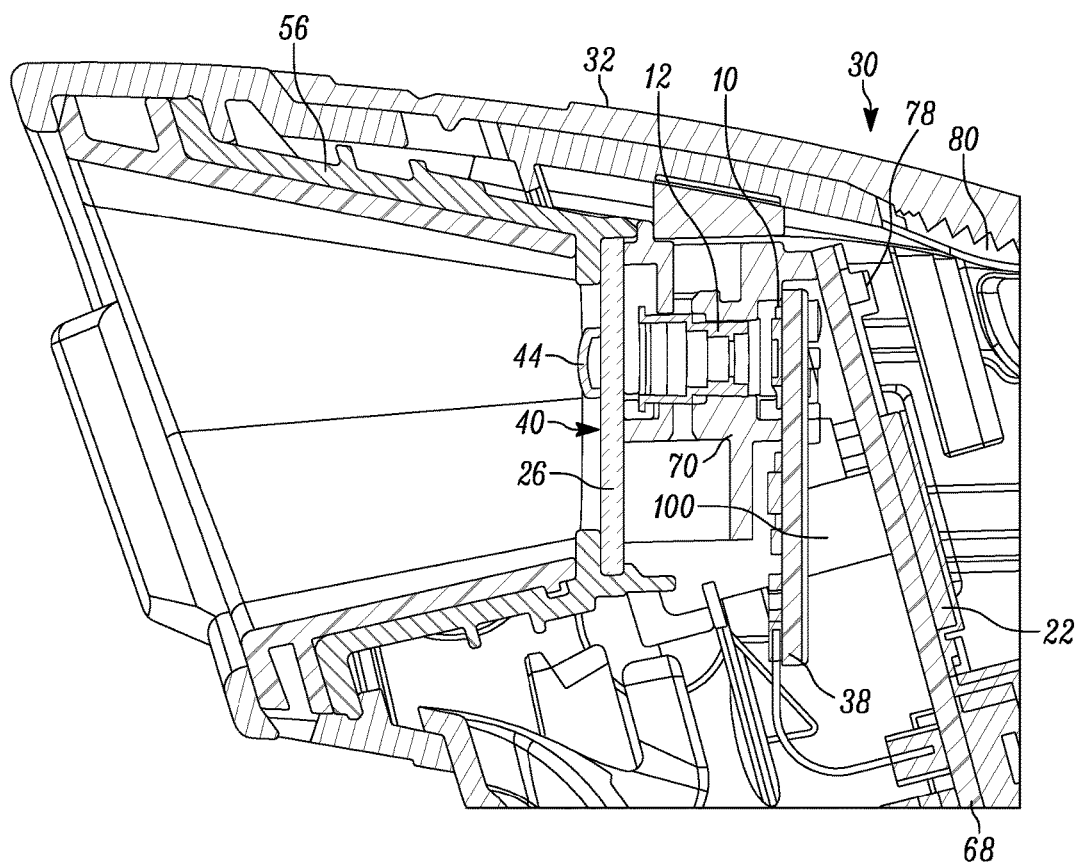
FIG. 11 is a broken-away, cross-sectional view of the imaging module inside the reader of FIG. 1.
Figure 12:
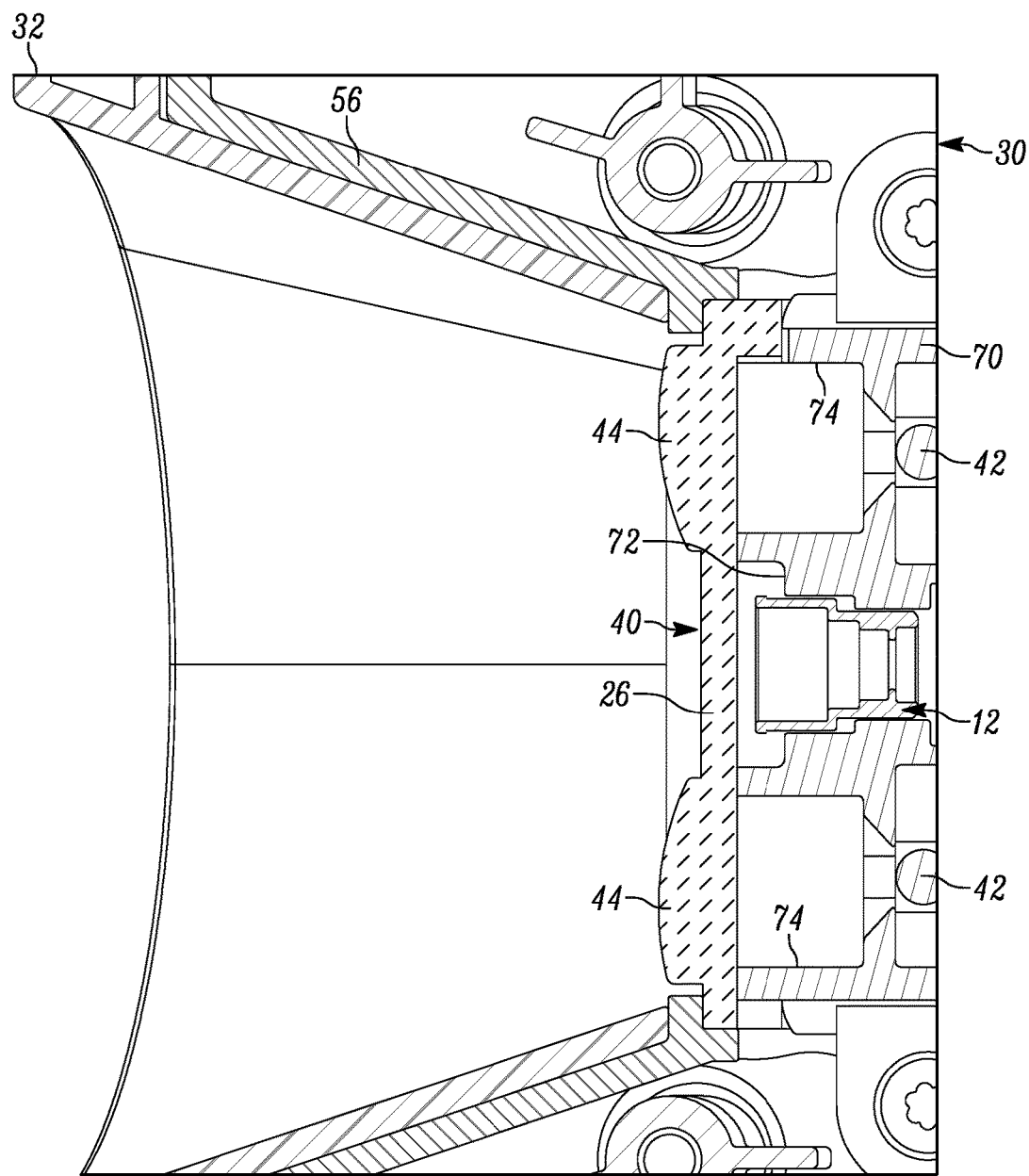
FIG. 12 is a broken-away, top sectional view depicting the imaging module mounted in the reader of FIG. 1.

As so assembled, the chassis 70 is a one-piece support that maintains the tilt angle between the PCBs 38, 68. The module 40 is insertable and mounted as a unitary assembly inside the reader 30. As shown in FIG. 10, the chassis 70 also has side lugs 112 that extend in opposite directions away from each other, and a pair of housing fasteners 114 that extend through openings 116 (see FIG. 4) in the lugs 112 for fixedly mounting the chassis 70 to threaded bores 126 inside the imaging reader 30. FIGS. 11-12 are sectional views of the module 40 after assembly in the housing. FIG. 11 depicts the tilt angle maintained between the PCBs 38, 68 in operation.

As also shown in FIGS. 11-12, the light-transmissive window 26 is positioned in direct, sealed contact with the chassis 70. The chassis walls of all the interior compartments 72, 74, and 76 extend forwardly away from the engine PCB 38 in a direction generally perpendicular to the engine PCB 38 and terminate in outer wall surfaces. The window 26 directly engages the outer wall surfaces of the chassis 70 and covers each compartment 72, 74, and 76. The chassis walls extend sufficiently forwardly to create physical barriers among the compartments 72, 74, and 76 to optically isolate them from one another, and the covering window 26 thus environmentally seals, optically isolates, and resists entry of any stray aiming and/or illuminating light into, the interior compartment 72 in which the imager 10 is contained.

Figure 22:
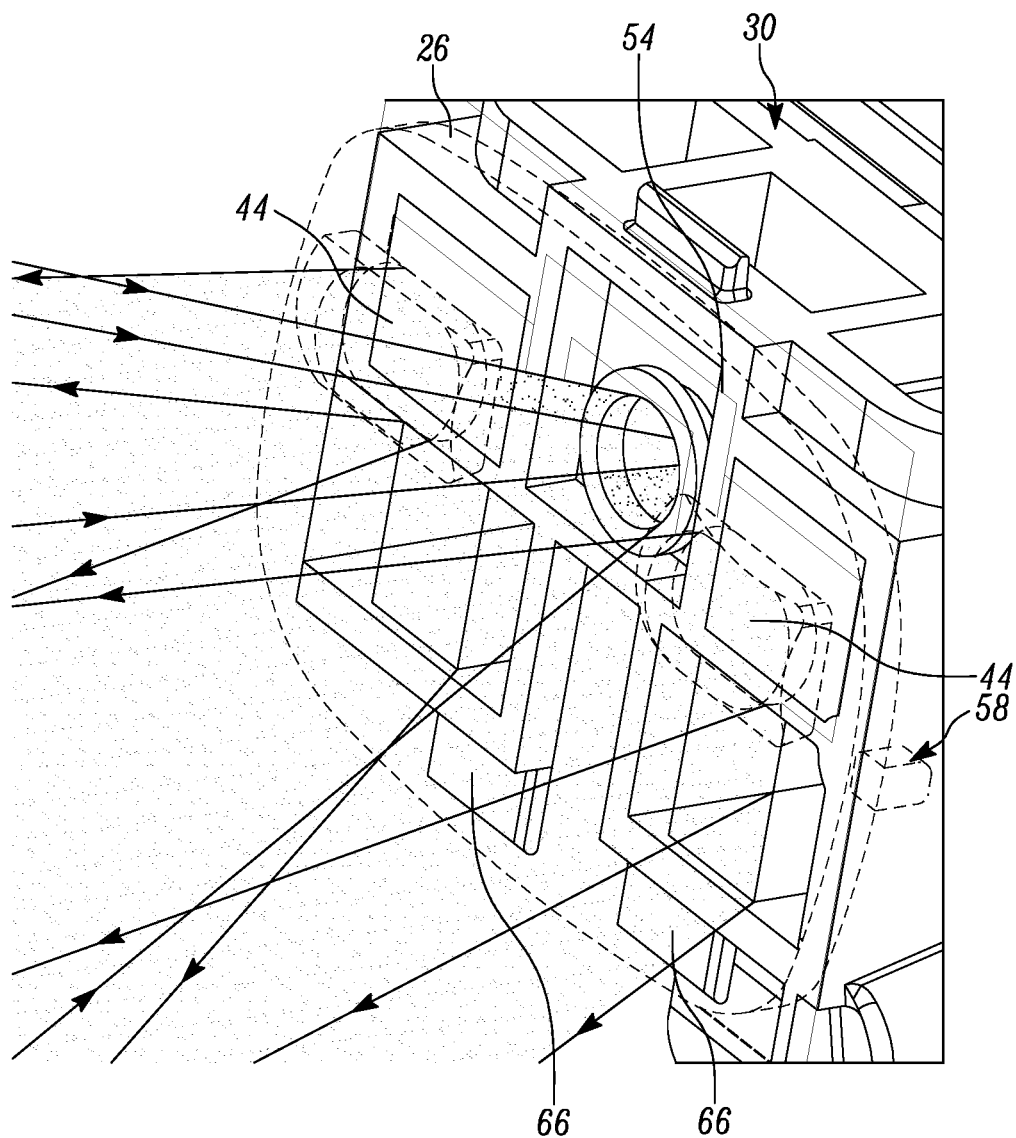
FIG. 22 is an enlarged, broken-away, perspective view of the imaging module depicting the aiming lights and the illuminating lights exiting the window, as well as the field of view of the imager entering the window, of the reader of FIG. 1.

As best seen in FIGS. 11-12, the window 26 environmentally seals the interior of the housing 32, for example, against dirt, moisture, dust, and like contaminants. A rubber gasket or seal 56 helps to seal the window 26 in its position at the front of the reader 30. As best shown in FIGS. 13-14, a plurality of locating pins 58 are integrally formed with the window 26 to assist in mounting the window 26 in its sealed position, and to prevent rotation of the window 26. One such pin 58 is provided at one side of the window 26, and a pair of such pins 58 is provided at the opposite side of the window 26. The locating pins 58 assist in locating the window 26 accurately with respect to the aiming, imaging, and illuminating systems. More particularly, the optical elements on the window 26 are accurately located relative to the aiming lenses 44, the aiming apertures 46, the aiming LEDs 42, the CPRs 66, and the illuminating LEDS 62. FIG. 22 depicts the aiming lights and the illuminating lights exiting the accurately located window 26, as well as the field of view of the imager 10 entering the accurately located window 26.

The window 26 is either held removably against, or is fixedly and permanently mounted, for example, by an adhesive or other fasteners, to the chassis 70. When the window 26 is thus fixedly mounted, the module 40 is completely sealed and can be moved around a manufacturing facility, or even shipped to another facility, without worry of contamination by environmental contaminants. Advantageously, the window 26 is generally planar and is positioned to be generally parallel to the PCB 38. The window 26 may also be curved or formed with some other shape, in which the case, the outer chassis surfaces are configured with a complementary contour so that a tight seal is made when the window 26 contacts the chassis 70. Although the window 26 is shown as contacting the chassis 70 at exterior chassis surfaces, it will be understood that the chassis 70 may also be recessed with a cavity in which the window 26 is mounted. A recessed window will be more resistant to scratches and contamination.

Figure 17:
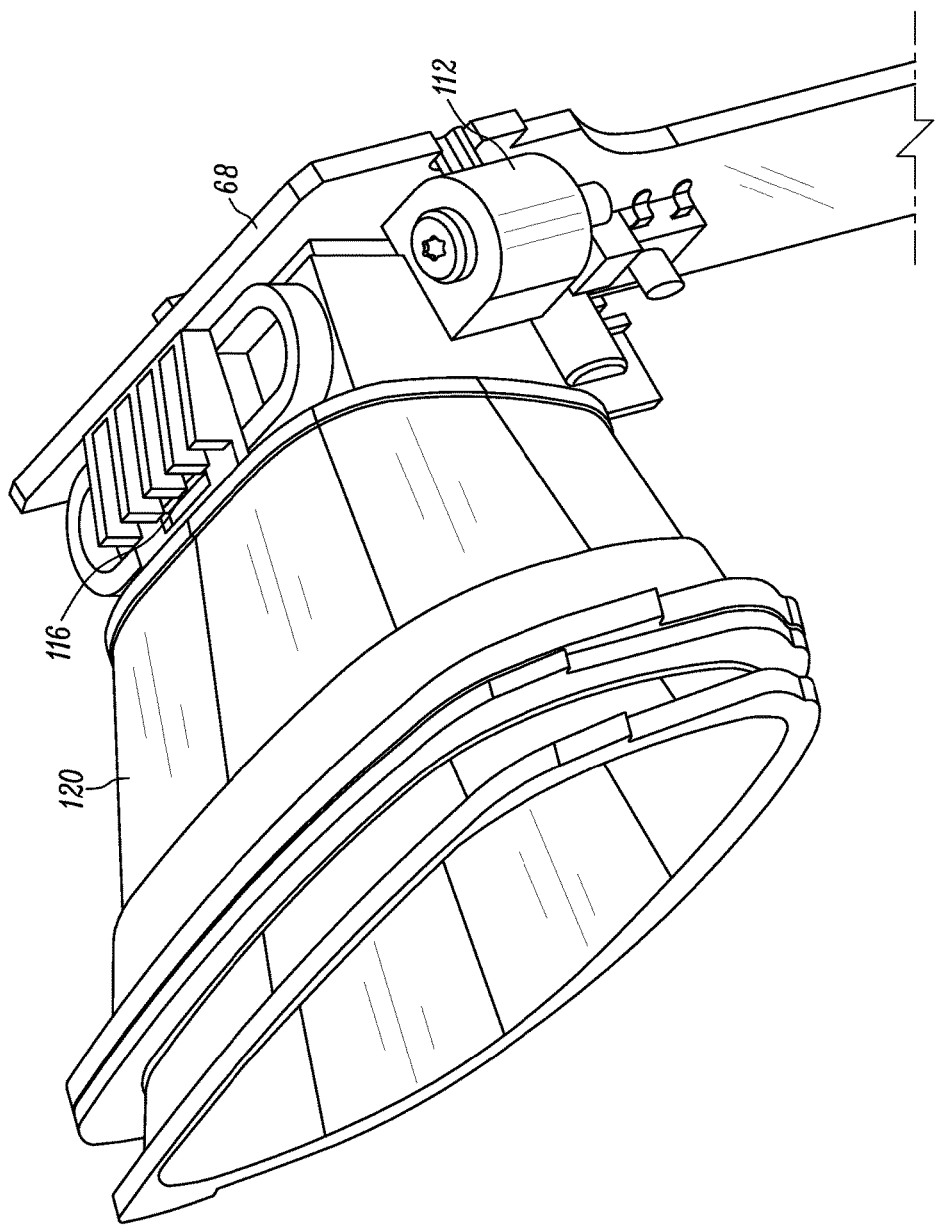
FIG. 17 is a broken-away, overhead, perspective view of the imaging module on which a hood for surrounding the window is mounted.
Figure 18:
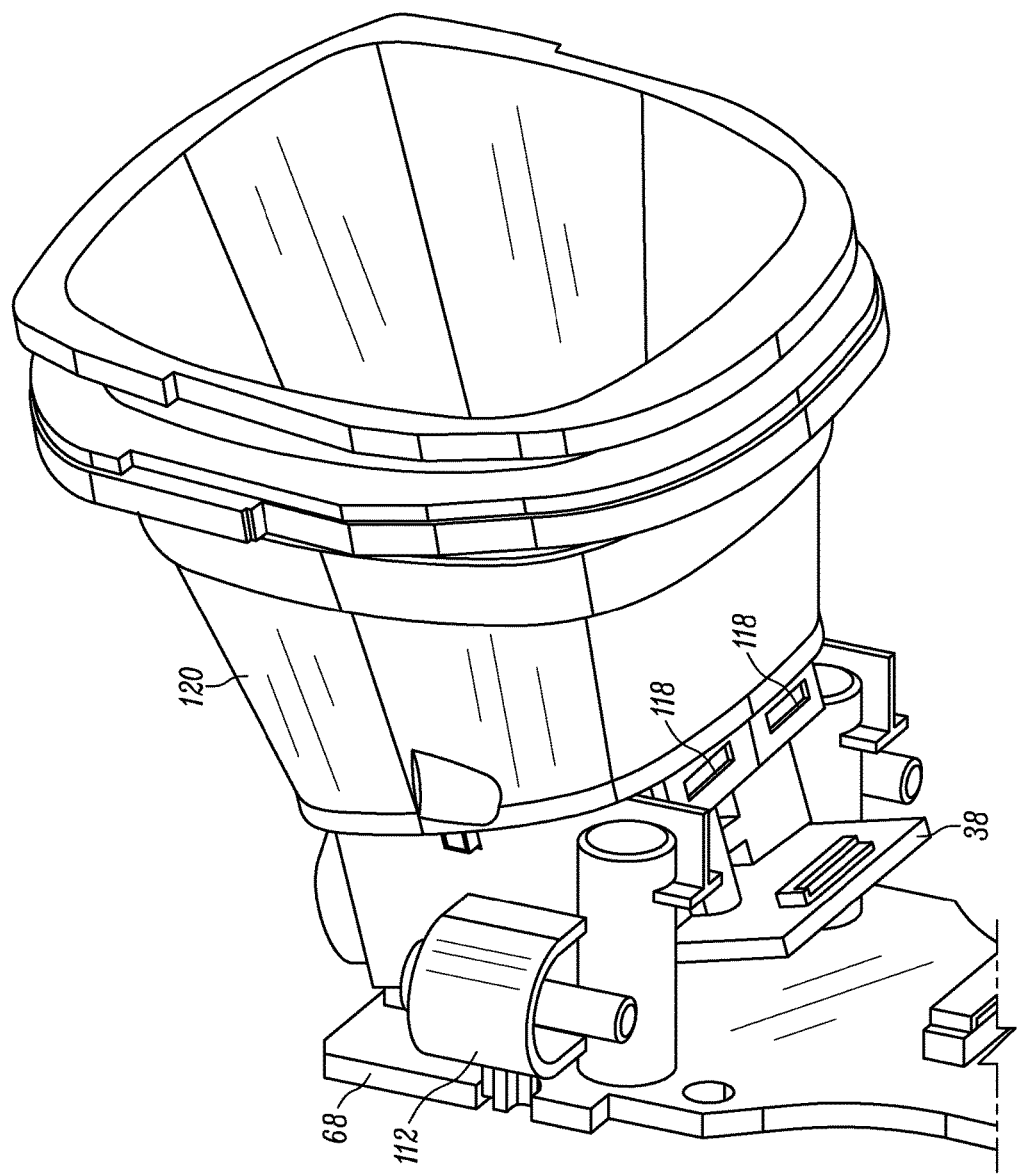
FIG. 18 is a view analogous to FIG. 17, as seen from below.

As shown in FIGS. 17-18, a bezel or hood 120 surrounds the window 26. The chassis has an upper hook 116 and a pair of lower hooks 118 that extend through complementary openings in the hood 120 for mounting the hood 120 and the window 26 on the chassis 70. Thus, the hood 120, the window 26, and the chassis 70 with the PCBs 38, 68 and their supported electro-optical components are all together mounted in the reader 30.

An indicating light source 78 (see FIGS. 9 and 11) may also supported on the handle PCB 68, and faces rearwardly of the chassis 70. The indicating light source 78 emits a visual indicating light to a light scattering section 80 of the body 32 whenever the target has been successfully read. The window 26 not only prevents any stray aiming and/or illuminating light from leaking to the light scattering section 80 and erroneously indicating that a target has been successfully read, but also prevents the visual indicating light from leaking to the interior compartments, and principally to the compartment 72 in which the imager 10 is contained.

The illuminating light sources 62 need not be mounted on the engine PCB 38 but, as shown in FIG. 19, could be mounted on the separate PCB 24, also sometimes referred to herein as a third or illuminating PCB. In a variant construction of the chassis, the chassis 70 of FIG. 19 has third chassis walls in direct contact with the illuminating PCB 24, for supporting the illuminating light sources 62, and for automatically positioning the illuminating PCB 24 to lie in a generally upright, third predetermined plane that preferably is coplanar, or generally parallel with, the engine PCB 38. The illuminating PCB 24 is advantageously registered in position by a pair of locating posts 122 and is fixedly secured in position with a snap-type action by snaps 124. Fasteners other than snaps could also be used.

Figure 20:
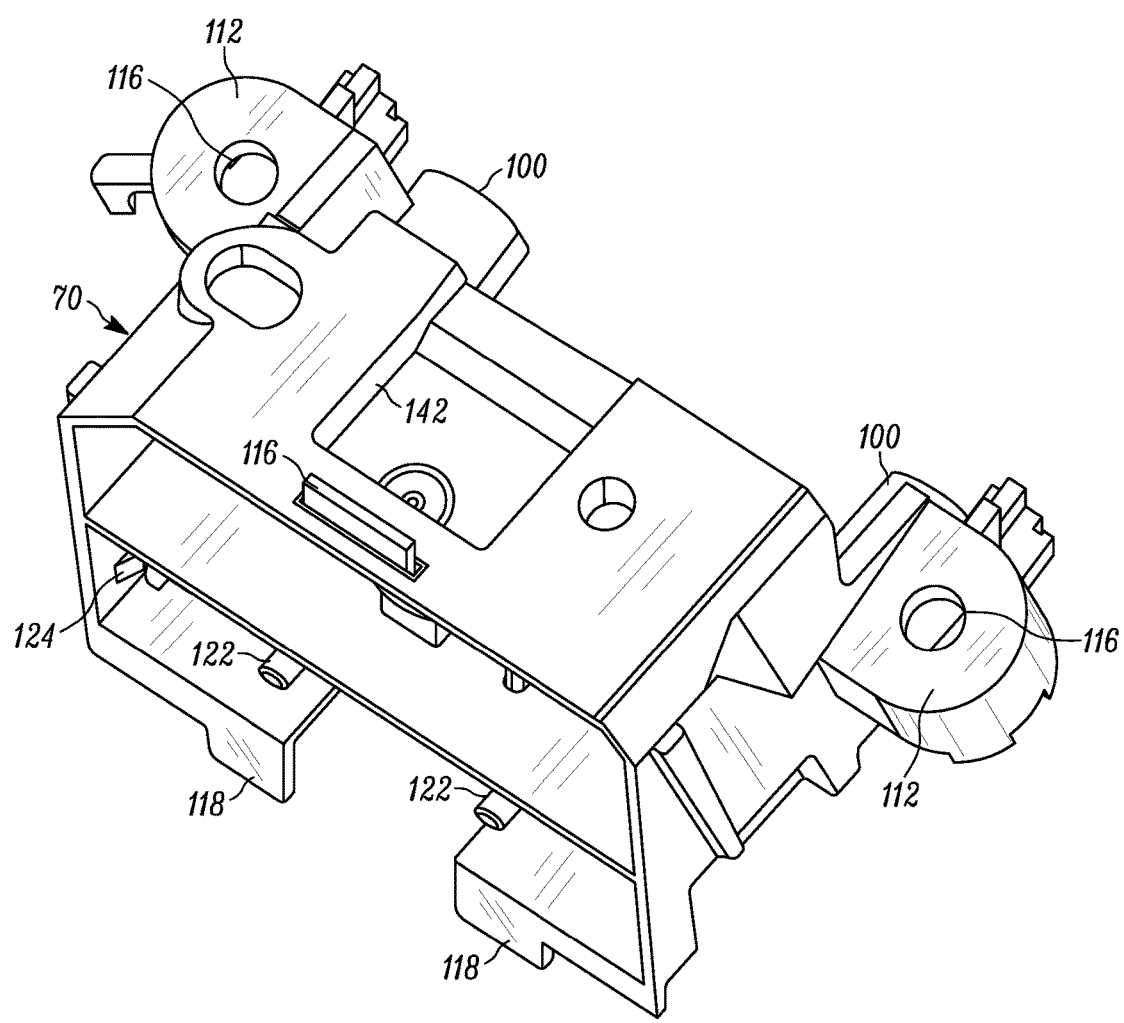
FIG. 20 is a perspective view of another embodiment of the chassis in isolation.
Figure 21:
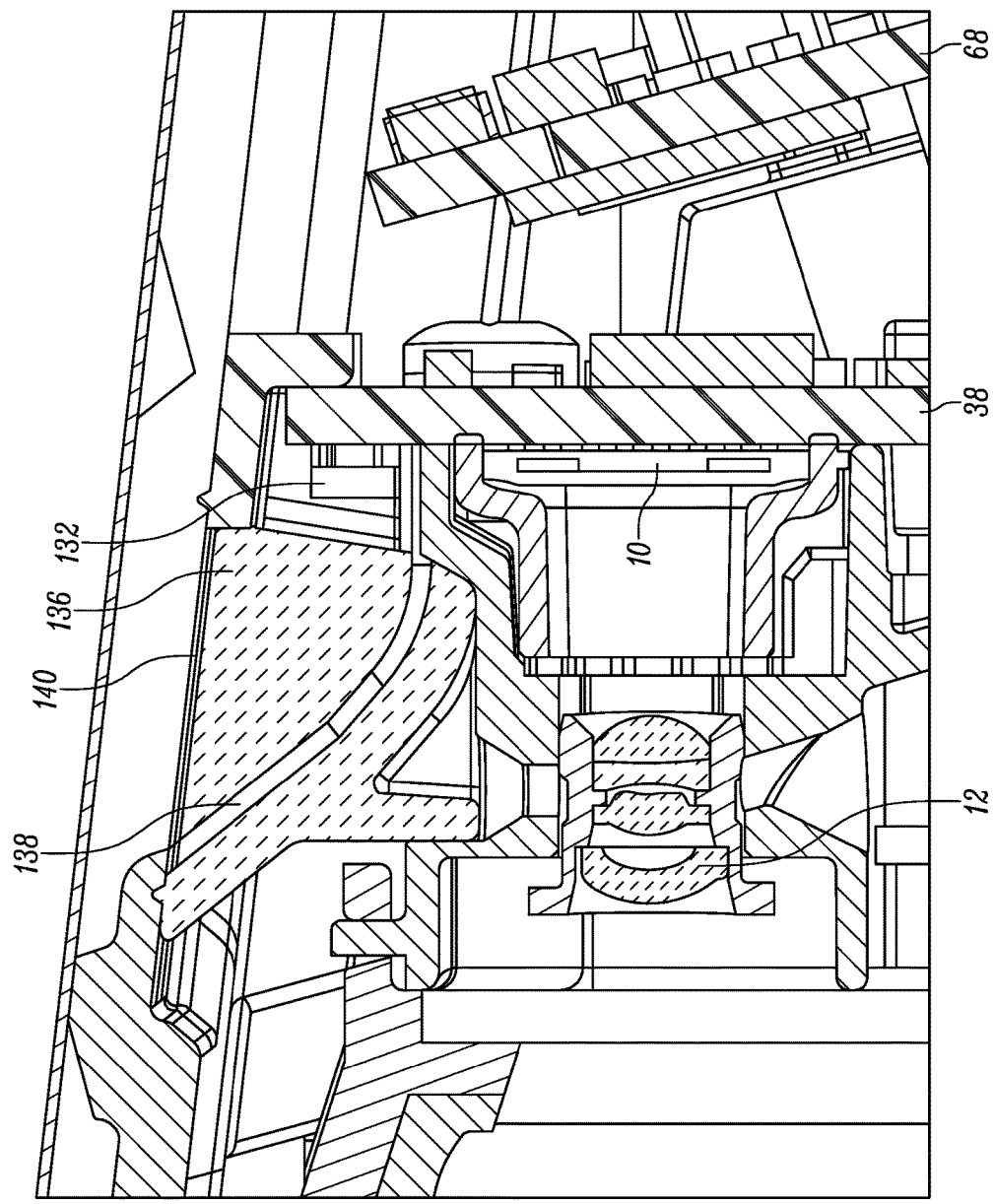
FIG. 21 is a side, sectional view of the chassis of FIG. 20 mounted within the reader and depicting a light guide.

As also shown in FIG. 19, a pair of battery level indicating LEDs 132, 134 for emitting light, preferably of different colors, is mounted on the engine PCB 38. As shown in FIG. 20, a well 142 is formed in the chassis in front of the indicating LEDs 132, 134. A light-conducting light guide 136 is mounted in the well 142 and has an internal reflector 138 that reflects and scatters the indicating light from the indicating LEDs 132, 134 upwardly toward an indicating window 140 or port at which the operator can see a green light when the battery level is high, or a red light when the battery level is low, or another color, such as yellow, when the battery level is at an intermediate value. The battery is mounted inside the handle 28 for wireless, powered, mobile operation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for reading a target by image capture, the module comprising:
a first printed circuit board (PCB);
an imaging system including an imager mounted on the first PCB, for capturing an image of the target over a field of view;
a second PCB;
an interface connector mounted on the second PCB; and
a chassis having first chassis walls in direct, surface-area contact with the first PCB, for supporting the imager, and for automatically positioning the first PCB, to lie in a generally upright, first predetermined plane, and second chassis walls in direct, surface-area contact with the second PCB, for supporting the interface connector, and for automatically positioning the second PCB, to lie in a generally tilted, second predetermined plane that is inclined at a tilt angle relative to the first predetermined plane, the first and second chassis walls being constituted as a one-piece support that maintains the tilt angle between the PCBs.

2. The module of claim 1, and an aiming light system including at least one aiming light source mounted on the first PCB, and an illuminating light system including at least one illuminating light source mounted on the first PCB, wherein the chassis has interior compartments in which the imager, the at least one aiming light source, and the at least one illuminating light source are respectively contained.

3. The module of claim 1, and a third PCB; and an illuminating light system including at least one illuminating light source mounted on the third PCB, and wherein the chassis has third chassis walls in direct contact with the third PCB, for supporting the at least one illuminating light source, and for automatically positioning the third PCB to lie in a generally upright, third predetermined plane.

4. The module of claim 1, wherein the first PCB has a pair of first cutouts, wherein the chassis has a first pair of locating posts received in the first cutouts for positioning the first PCB to lie in the first predetermined plane, and a first pair of PCB fasteners for securing the first PCB to fixedly stay in the first predetermined plane; and wherein the second PCB has a pair of second cutouts, wherein the chassis has a second pair of locating posts received in the second cutouts for positioning the second PCB to lie in the second predetermined plane, and a second pair of PCB fasteners for securing the second PCB to fixedly stay in the second predetermined plane.

5. The module of claim 1, wherein the chassis has a pair of lugs that extend in opposite directions away from each other, and a pair of housing fasteners that extend through openings in the lugs for fixedly mounting the chassis in an imaging reader.

6. The module of claim 1, and a light-transmissive window positioned in direct contact with the chassis, and a hood for surrounding the window, and wherein the chassis has a plurality of hooks that extend through openings in the hood for mounting the hood and the window on the chassis.

7. The module of claim 1, and a well in the chassis, and a light guide mounted in the well for guiding indicating lights away from the module.

8. An imaging reader for reading a target by image capture, the reader comprising:
  a housing having an interior; and
  an imaging module mounted as a unitary assembly within the interior of the housing, the module including
    a first printed circuit board (PCB);
    an imaging system including an imager mounted on the first PCB, for capturing an image of the target over a field of view,
    a second PCB,
    an interface connector mounted on the second PCB, and
    a chassis having first chassis walls in direct, surface-area contact with the first PCB, for supporting the imager, and for automatically positioning the first PCB, to lie in a generally upright, first predetermined plane, and second chassis walls in direct, surface-area contact with the second PCB, for supporting the interface connector, and for automatically positioning the second PCB, to lie in a generally tilted, second predetermined plane that is inclined at a tilt angle relative to the first predetermined plane, the first and second chassis walls being constituted as a one-piece support that maintains the tilt angle between the PCBs.

9. The reader of claim 8, and an aiming light system including at least one aiming light source mounted on the first PCB, and wherein the chassis has interior compartments in which the imager and the at least one aiming light source are respectively contained.

10. The reader of claim 8, and an illuminating light system including at least one illuminating light source mounted on the first PCB, and wherein the chassis has interior compartments in which the imager and the at least one illuminating light source are respectively contained.

11. The reader of claim 8, and a third PCB; and an illuminating light system including at least one illuminating light source mounted on the third PCB, and wherein the chassis has third chassis walls in direct contact with the third PCB, for supporting the at least one illuminating light source, and for positioning the third PCB to lie in a generally upright, third predetermined plane.

12. The reader of claim 8, wherein the first PCB has a pair of first cutouts, wherein the chassis has a first pair of locating posts received in the first cutouts for positioning the first PCB to lie in the first predetermined plane, and a first pair of PCB fasteners for securing the first PCB to fixedly stay in the first predetermined plane; and wherein the second PCB has a pair of second cutouts, wherein the chassis has a second pair of locating posts received in the second cutouts for positioning the second PCB to lie in the second predetermined plane, and a second pair of PCB fasteners for securing the second PCB to fixedly stay in the second predetermined plane.

13. The reader of claim 8, wherein the chassis has a pair of lugs that extend in opposite directions away from each other, and a pair of housing fasteners that extend through openings in the lugs for fixedly mounting the chassis in the housing.

14. The reader of claim 8, and a light-transmissive window positioned in direct contact with the chassis, and a hood for surrounding the window, and wherein the chassis has a plurality of hooks that extend through openings in the hood for mounting the hood and the window on the chassis.

15. The reader of claim 8, wherein the housing has an handle extending along a handle axis at the tilt angle, and wherein the second PCB extends along the handle axis at the tilt angle inside the handle.

16. A method of assembling an imaging reader for reading a target by image capture, the method comprising:
  assembling an imaging module by mounting an imager on a first printed circuit board (PCB); by mounting an interface connector on a second PCB; by supporting the imager, and by automatically positioning the first PCB, to lie in direct, surface-area contact with first chassis walls of a chassis in a generally upright, first predetermined plane; by supporting the interface connector, and by automatically positioning the second PCB, to lie in direct, surface-area contact with second chassis walls of the chassis in a generally tilted, second predetermined plane that is inclined at a tilt angle relative to the first predetermined plane; and by constituting the first and second chassis walls as a one-piece support that maintains the tilt angle between the PCBs; and
  mounting the assembled imaging module as a unitary assembly into the reader.

17. The method of claim 16, and mounting at least one aiming light source and at least one illuminating light source on the first PCB, and containing the imager, the at least one aiming light source, and the at least one illuminating light source in interior compartments of the chassis.

18. The method of claim 16, and forming a pair of first cutouts in the first PCB, and receiving a first pair of locating posts of the chassis in the first cutouts for positioning the first PCB to lie in the first predetermined plane, and securing the first PCB to fixedly stay in the first predetermined plane; and forming a pair of second cutouts in the second PCB, and receiving a second pair of locating posts of the chassis in the second cutouts for positioning the second PCB to lie in the second predetermined plane, and securing the second PCB to fixedly stay in the second predetermined plane.

19. The method of claim 16, and extending a pair of lugs in opposite directions away from each other on the chassis, and wherein the mounting of the imaging module is performed by fastening the lugs to an interior of the imaging reader.

20. The method of claim 16, and positioning a light-transmissive window in direct contact with the chassis, and surrounding the window with a hood, and mounting the hood and the window on the chassis by hooking the hood to the chassis.

* * * * *